US011487541B2

(12) United States Patent
Corbal et al.

(10) Patent No.: US 11,487,541 B2
(45) Date of Patent: Nov. 1, 2022

(54) SYSTEMS, APPARATUSES, AND METHODS FOR CHAINED FUSED MULTIPLY ADD

(71) Applicant: Intel Corporation, Santa Clara, CA (US)

(72) Inventors: Jesus Corbal, King City, OR (US); Robert Valentine, Kiryat Tivon (IL); Roman S. Dubtsov, Novosibirsk (RU); Nikita A. Shustrov, Novosibirsk (RU); Mark J. Charney, Lexington, MA (US); Dennis R. Bradford, Portland, OR (US); Milind B. Girkar, Sunnyvale, CA (US); Edward T. Grochowski, San Jose, CA (US); Thomas D. Fletcher, Sherwood, OR (US); Warren E. Ferguson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 17/107,134

(22) Filed: Nov. 30, 2020

(65) Prior Publication Data

US 2021/0081198 A1 Mar. 18, 2021

Related U.S. Application Data

(63) Continuation of application No. 16/169,456, filed on Oct. 24, 2018, now Pat. No. 10,853,065, which is a
(Continued)

(51) Int. Cl.
G06F 9/30 (2018.01)
G06F 7/544 (2006.01)
G06F 7/483 (2006.01)
G06F 9/38 (2018.01)

(52) U.S. Cl.
CPC ............ *G06F 9/3001* (2013.01); *G06F 7/483* (2013.01); *G06F 7/5443* (2013.01);
(Continued)

(58) Field of Classification Search
CPC ...... G06F 9/3001; G06F 7/483; G06F 7/5443; G06F 9/30036; G06F 9/30109; G06F 9/30112
See application file for complete search history.

(56) References Cited

U.S. PATENT DOCUMENTS 5,793,661 A * 8/1998 Dulong ................. G06F 7/5443
708/603
9,360,920 B2 * 6/2016 Hancock ................. G06F 7/485
(Continued)

OTHER PUBLICATIONS

Final Office Action, U.S. Appl. No. 16/169,456, dated Apr. 8, 2020, 6 pages.
(Continued)

*Primary Examiner* — Corey S Faherty
(74) *Attorney, Agent, or Firm* — Nicholson De Vos Webster & Elliott, LLP

(57) ABSTRACT

Embodiments of systems, apparatuses, and methods for chained fused multiply add. In some embodiments, an apparatus includes a decoder to decode a single instruction having an opcode, a destination field representing a destination operand, a first source field representing a plurality of packed data source operands of a first type that have packed data elements of a first size, a second source field representing a plurality of packed data source operands that have packed data elements of a second size, and a field for a memory location that stores a scalar value. A register file having a plurality of packed data registers includes registers for the plurality of packed data source operands that have packed data elements of a first size, the source operands that have packed data elements of a second size, and the desti-
(Continued)

nation operand. Execution circuitry executes the decoded single instruction to perform iterations of packed fused multiply accumulate operations by multiplying packed data elements of the sources of the first type by sub-elements of the scalar value, and adding results of these multiplications to an initial value in a first iteration and a result from a previous iteration in subsequent iterations.

34 Claims, 24 Drawing Sheets

Related U.S. Application Data continuation of application No. 15/299,420, filed on Oct. 20, 2016, now Pat. No. 10,146,535.

(52) U.S. Cl.
CPC ...... *G06F 9/30036* (2013.01); *G06F 9/30109* (2013.01); *G06F 9/30112* (2013.01); *G06F 9/3893* (2013.01)

(56) References Cited

U.S. PATENT DOCUMENTS

| | | | | |
|---|---|---|---|---|
| 9,778,911 | B2* | 10/2017 | Hancock | ............... G06F 7/4876 |
| 2008/0256150 | A1* | 10/2008 | Quinnell | ................ G06F 7/483 |
| | | | | 708/209 |
| 2009/0265409 | A1* | 10/2009 | Peleg | .................... G06F 9/3001 |
| | | | | 712/222 |
| 2012/0072703 | A1 | 3/2012 | Srinivasan et al. | |

OTHER PUBLICATIONS

Non-Final Office Action received for U.S. Appl. No. 16/169,456, dated Sep. 9, 2019, 4 pages.

Notice of Allowance from U.S. Appl. No. 15/299,420, dated Aug. 1, 2018, 9 pages.

Notice of Allowance, U.S. Appl. No. 16/169,456, dated Jul. 22, 2020, 7 pages.

\* cited by examiner

ACCUMULATOR 2X INPUT SIZES 201

| SOURCES | BITS | ACCUMULATOR | BITS |
|---|---|---|---|
| BYTE | 8 | WORD/HPFP | 16 |
| WORD | 16 | INT32/SPFP | 32 |
| SPFP/INT32 | 32 | INT64/DPFP | 64 |

ACCUMULATOR 4X INPUT SIZES 203

| SOURCES | BITS | ACCUMULATOR | BITS |
|---|---|---|---|
| BYTE | 8 | INT32/SPFP | 32 |
| WORD | 16 | INT64/DPFP | 64 |

ACCUMULATOR 8X INPUT SIZES 205

| SOURCES | BITS | ACCUMULATOR | BITS |
|---|---|---|---|
| BYTE | 8 | INT64/DPFP | 64 |

FIG. 2

FETCH AN INSTRUCTION HAVING FIELDS FOR AN OPCODE, IDENTIFIERS OF A PLURALITY OF PACKED DATA SOURCE OPERANDS OF A FIRST TYPE, AN IDENTIFIER FOR A PACKED DATA ELEMENT SOURCE OPERAND OF A SECOND TYPE, AN IDENTIFIER FOR A SOURCE OPERAND OF A THIRD TYPE, AND AN IDENTIFIER FOR A PACKED DATA DESTINATION OPERAND 701

↓

DECODE THE INSTRUCTION 703

↓

RETRIEVE DATA ASSOCIATED WITH THE SOURCE OPERANDS 705

↓

EXECUTE THE DECODED INSTRUCTION TO, FOR EACH PACKED DATA ELEMENT POSITION OF THE DESTINATION, PERFORM OF PACKED FUSED MULTIPLY ACCUMULATE OPERATIONS USING BY MULTIPLYING PACKED DATA ELEMENTS OF THE SOURCES OF THE FIRST TYPE BY SUB-ELEMENTS OF THE SCALAR VALUE, AND ADDING THE RESULTS OF THESE MULTIPLICATIONS TO EITHER AN INITIAL VALUE (FIRST ITERATION) OR A RESULT FROM A PREVIOUS ITERATION
(E.G., IN SOME EMBODIMENTS, PER EACH PACKED DATA ELEMENT GROUP OF THE SOURCES OF THE FIRST TYPE,
1) MULTIPLY EACH PACKED DATA ELEMENT OF THE PACKED DATA ELEMENT GROUP OF THE SOURCES OF THE FIRST TYPE BY A CORRESPONDING PACKED DATA ELEMENT FROM A SCALAR VALUE FROM THE SOURCE OPERAND OF THE THIRD TYPE, WHEREIN THE SCALAR VALUE IS FROM A PACKED DATA ELEMENT POSITION OF THE SCALAR THAT CORRESPONDS TO THE SOURCE OF THE FIRST TYPE, 2) ADD EACH OF THE MULTIPLICATIONS TO GENERATE AN ITERATION RESULT, WHEREIN THE NUMBER OF ADDITIONS PER GROUP IS THE SIZE OF THE SCALAR VALUE DIVIDED BY THE SIZE OF THE PACKED DATA ELEMENTS OF THE SOURCES OF THE FIRST TYPE MINUS ONE, 3) ADD TO THE ITERATION RESULT THE ITERATION RESULT OF THE PREVIOUS ITERATION OR AN INITIAL VALUE, AND 4) STORE A FINAL RESULT INTO A PACKED DATA ELEMENT POSITION OF THE DESTINATION THAT CORRESPONDS TO THE LOCATION OF THE SCALAR PACKED DATA ELEMENT, WHEREIN THE FINAL RESULT IS A SUMMATION OF ALL OF THE ITERATION RESULTS AND THE INITIAL VALUE) 707

↓

COMMIT THE RESULT OF THE EXECUTED INSTRUCTION 709

FIG. 7

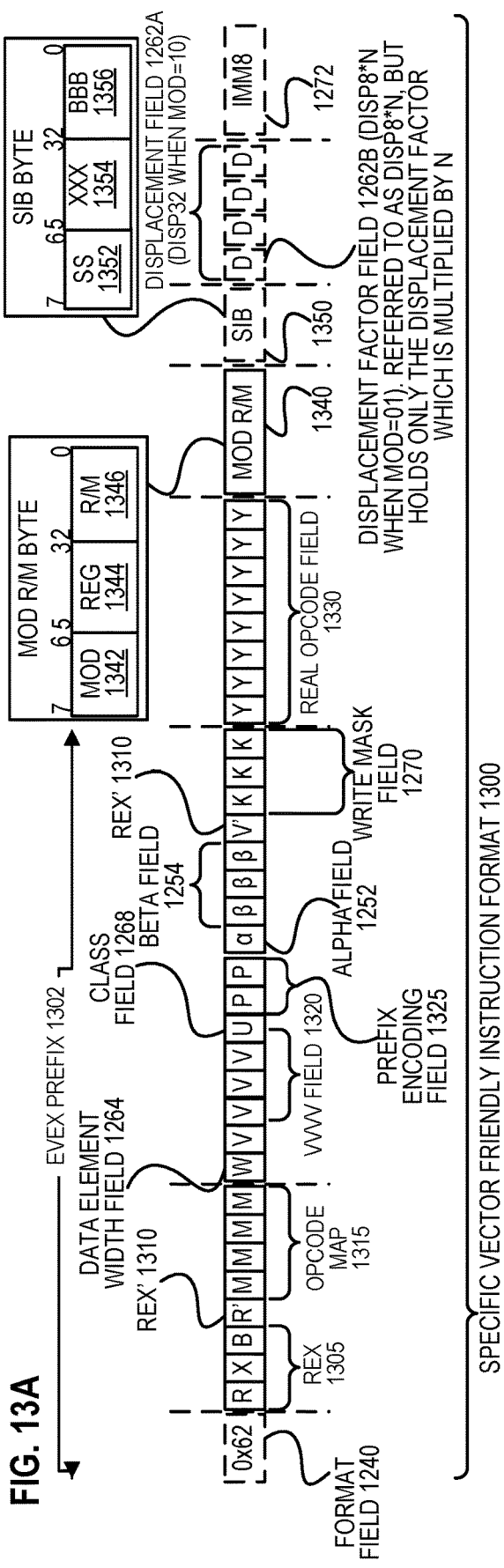
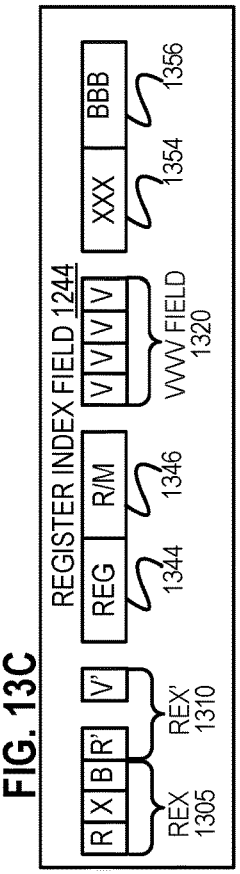
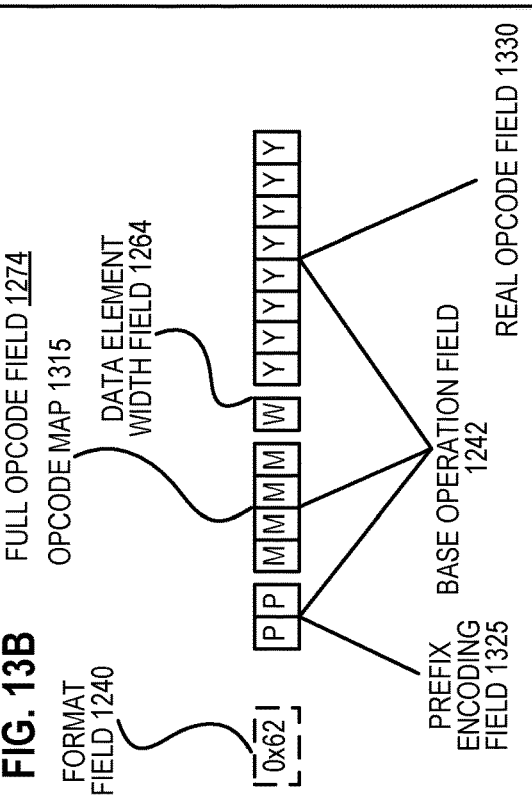
FIG. 13A
FIG. 13B
FIG. 13C

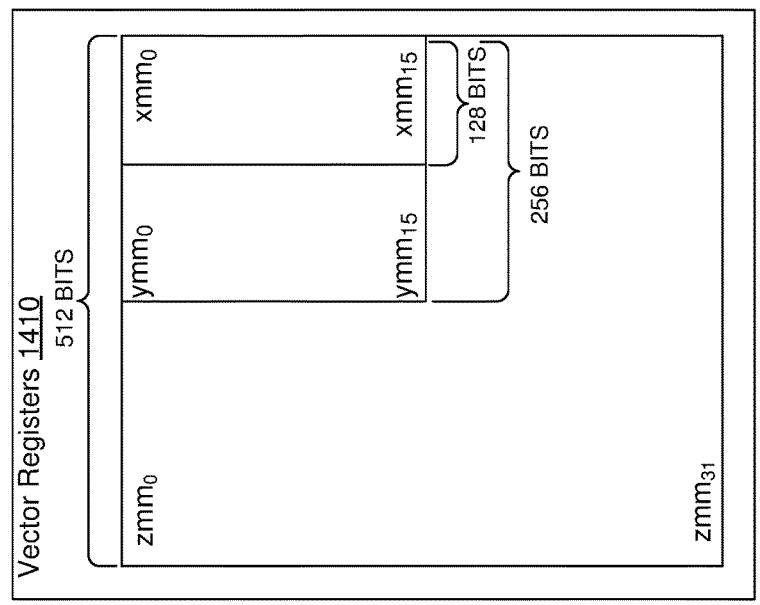
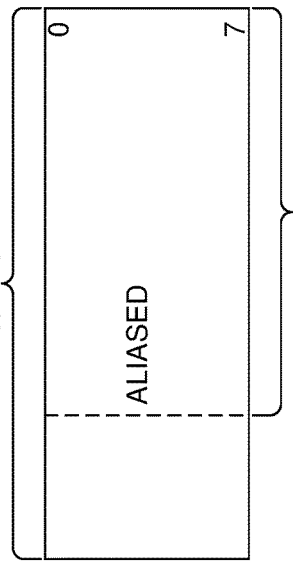
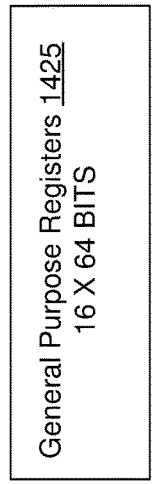
FIG. 14

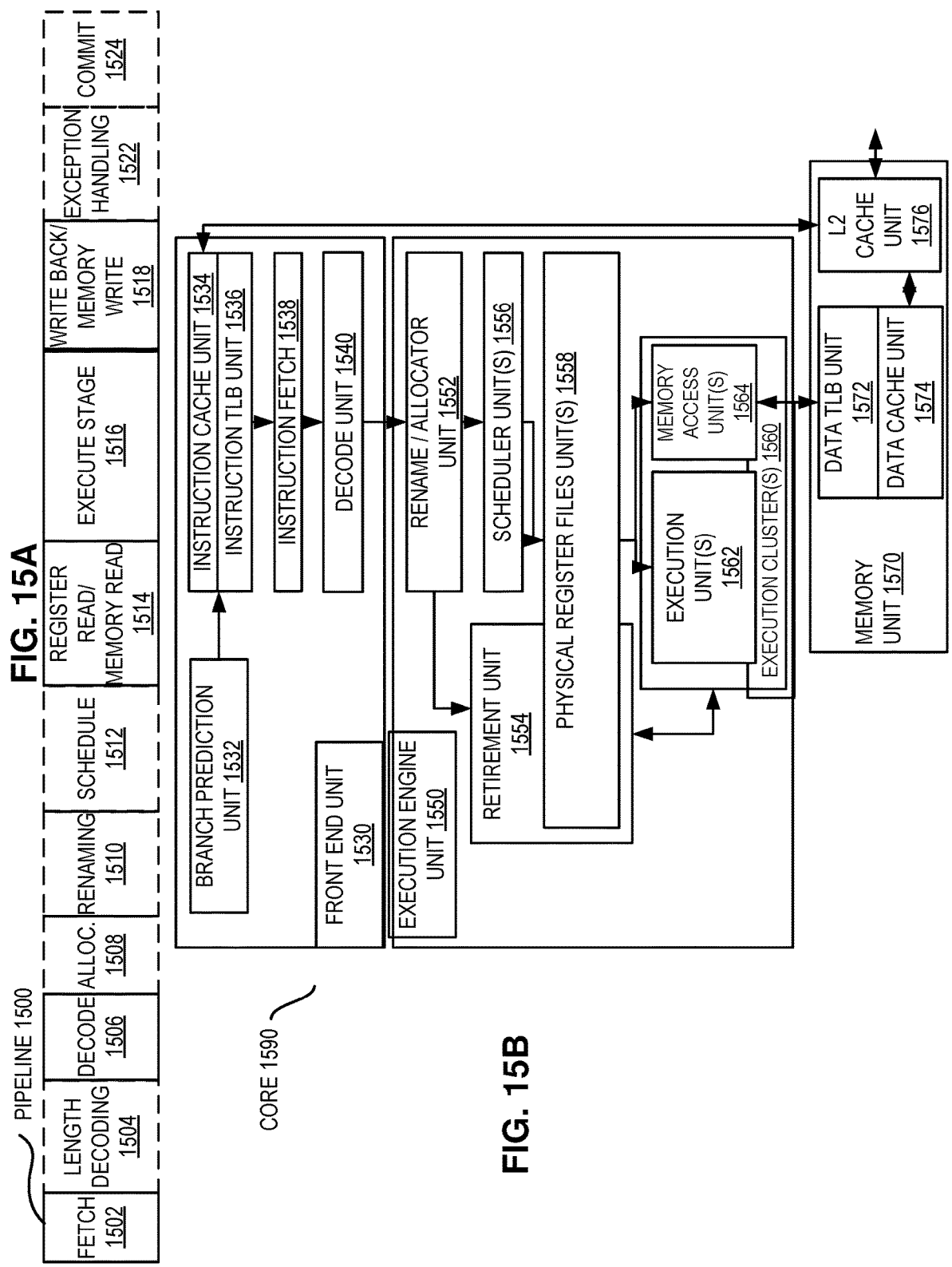

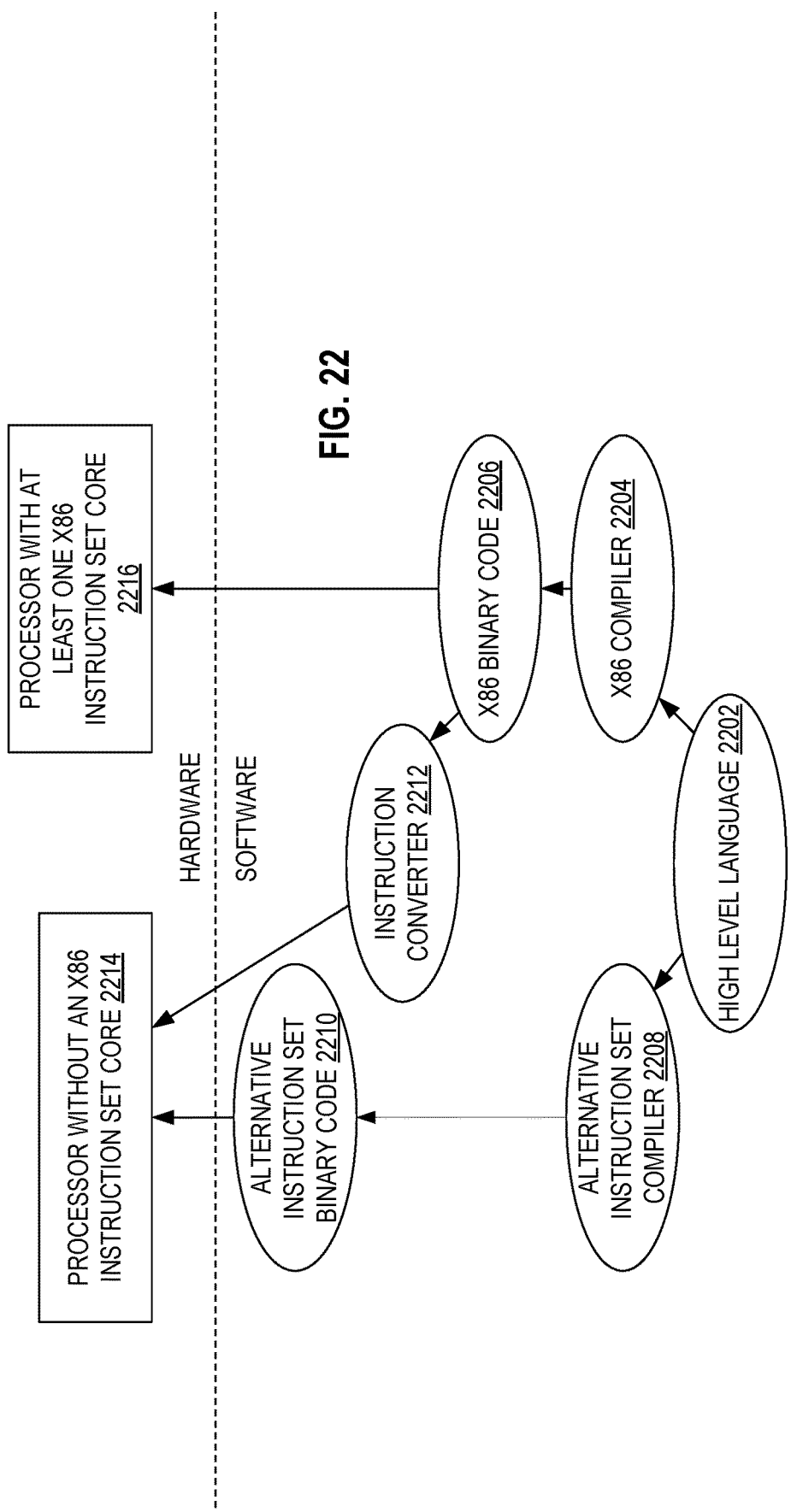

US 11,487,541 B2

SYSTEMS, APPARATUSES, AND METHODS FOR CHAINED FUSED MULTIPLY ADD

FIELD OF INVENTION

The field of invention relates generally to computer processor architecture, and, more specifically, to instructions which when executed cause a particular result.

BACKGROUND

A common operation in linear algebra is a multiply accumulate operation (e.g., c=c+a*b). The multiply accumulate is typically a sub-operation in a stream of operations, for instance, a dot product between two vectors, which could also be a single product of a column and a row in a matrix multiply. For example,
C=0
For (I)

$$C+=A[I]*B[I]$$

BRIEF DESCRIPTION OF THE DRAWINGS

The present invention is illustrated by way of example and not limitation in the figures of the accompanying drawings, in which like references indicate similar elements and in which:

FIG. 2 illustrates power-of-two sized SIMD implementations wherein the accumulators use input sizes that are larger than the inputs to the multipliers according to an embodiment;

FIG. 7 illustrates an embodiment of method performed by a processor to process a chained fused multiply accumulate instruction;

FIG. 13A is a block diagram illustrating an exemplary specific vector friendly instruction format according to embodiments of the invention;

FIG. 13B is a block diagram illustrating the fields of the specific vector friendly instruction format 1300 that make up the full opcode field 1274 according to one embodiment of the invention;

FIG. 13C is a block diagram illustrating the fields of the specific vector friendly instruction format 1300 that make up the register index field 1244 according to one embodiment of the invention;

FIG. 14 is a block diagram of a register architecture 1400 according to one embodiment of the invention;

FIG. 15A is a block diagram illustrating both an exemplary in-order pipeline and an exemplary register renaming, out-of-order issue/execution pipeline according to embodiments of the invention;

FIG. 15B is a block diagram illustrating both an exemplary embodiment of an in-order architecture core and an exemplary register renaming, out-of-order issue/execution architecture core to be included in a processor according to embodiments of the invention;

FIG. 22 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In processing large data sets, the memory and computation density can be increased by sizing the datatypes as small as possible. If the input terms come from sensor data, then 8 or 16-bit integer data may be expected as inputs. Neural network calculations, which also can be coded to match this dense format, typically have "small" numbers as input terms. However, an accumulator is summing products, implying that the accumulator should tolerate two times the number of bits of the input terms (due to the nature of multiplication) and potentially much more in order to avoid overflow or saturation at any point in the computation.

Figure 1:
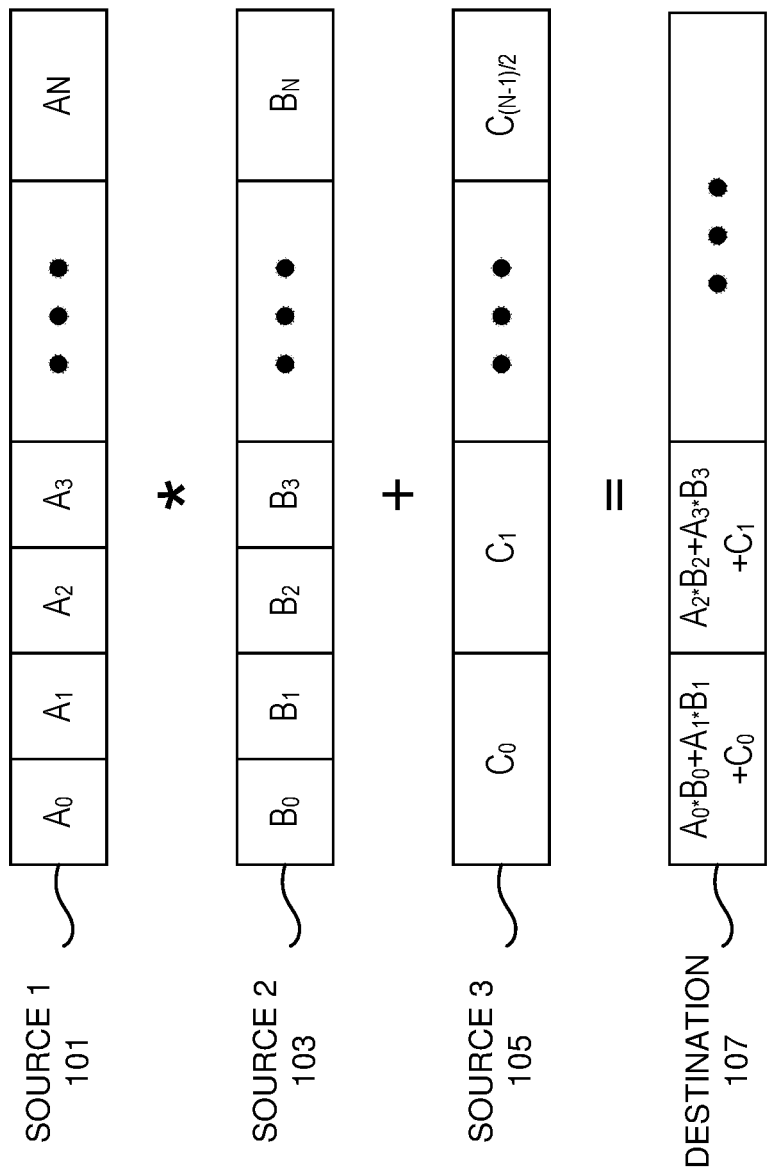
FIG. 1 illustrates an exemplary execution of a fused multiply accumulate instruction that uses different sized operands according to an embodiment.

Detailed herein are embodiments that attempt to keep the input data size small and sum to a larger accumulator in a chain of fused multiply accumulate (FMA) operation. FIG. 1 illustrates an exemplary execution of a fused multiply accumulate instruction that uses different sized operands according to an embodiment. A first source 101 (e.g., a SIMD or vector register) and a second source 103 store "half-sized" packed data elements with respect to a third source 105 (e.g., single input, multiple data (SIMD) or vector register) that stores full-size packed data elements used for accumulation. Any set of values where the packed data element sizes are in in this manner are supportable.

As shown, values stored in packed data elements of the same position of the first and second sources 101 and 103 are multiplied together. For example, A0*B0, A1*B1, etc. A result of two such "half-sized" packed data element multiplications are added to a corresponding "full-sized" packed data element from the third source 105. For example, A0*B0+A1*B1+C0, etc.

The result is stored in a destination 107 (e.g., a SIMD register) that has packed data element sizes that are at least "full-sized." In some embodiments, the third source 105 and the destination 107 are the same.

FIG. 2 illustrates power-of-two sized SIMD implementations wherein the accumulators use input sizes that are larger than the inputs to the multipliers according to an embodiment. Note the source (to the multipliers) and accumulator values may be signed or unsigned values. For an accumulator having 2X input sizes (in other words, the accumulator input value is twice the size of the packed data element sizes of the sources) table 201 illustrates different configurations. For byte sized sources, the accumulator uses word or half-precision floating-point (HPFP) values that are 16-bit in size. For word sized sources, the accumulator uses 32-bit integer or single-precision floating-point (SPFP) values that are 32-bit in size. For SPFP or 32-bit integer sized sources, the accumulator uses 64-integer or double-precision floating-point (DPFP) values that are 64-bit in size. Using FIG. 1 as an example, when the packed data element sizes of source 1 101 and source 2 103 are 8 bits, then the accumulator will use 16-bit sized data elements from source 3 103. When the packed data element sizes of source 1 101 and source 2 103 are 16 bits, then the accumulator will use 32-bit sized data elements from source 3 103. When the packed data element sizes of source 1 101 and source 2 103 are 32 bits, then the accumulator will use 64-bit sized data elements from source 3 103.

For an accumulator having 4X input sizes (in other words, the accumulator input value is four times the size of the packed data element sizes of the sources) table 203 illustrates different configurations. For byte sized sources, the accumulator uses 32-bit integer or single-precision floating-point (SPFP) values that are 32-bit in size. For word sized sources, the accumulator uses 64-bit integer or double-precision floating-point (DPFP) values that are 64-bit in size. Using FIG. 1 as an example, when the packed data element sizes of source 1 101 and source 2 103 are 8 bits, then the accumulator will use 32-bit sized data elements from source 3 103. When the packed data element sizes of source 1 101 and source 2 103 are 16 bits, then the accumulator will use 64-bit sized data elements from source 3 103.

For an accumulator having 8X input sizes (in other words, the accumulator input value is eight times the size of the packed data element sizes of the sources) table 205 illustrates a configuration. For byte sized sources, the accumulator uses 64-bit integer or double-precision floating-point (DPFP) values that are 64-bit in size. Using FIG. 1 as an example, when the packed data element sizes of source 1 101 and source 2 103 are 8 bits, then the accumulator will use 64-bit sized data elements from source 3 103.

The above discussion of fused multiply accumulate can be applied to a chained implementation such that a result of one FMA circuit is fed into another FMA circuit, etc. Detailed herein are embodiments of instructions and circuitry for chained fused multiply accumulate. In some embodiments, the chained fused multiply accumulate instruction is of mixed precision and/or uses horizontal reduction as detailed herein.

For example, detailed herein are embodiments of an instruction that when executed causes an iterative fused multiply-accumulates using a sequentially selected memory operand in each iteration. In some embodiments, rounding is used for fused multiply and adds. In some embodiments, saturation is performed for dot-products.

For example, detailed herein are embodiments of an instruction that when executed causes, per iteration (source register of a first type), multiplication of M N-sized packed data elements from a first source and an indexed value of a second source (scalar) that corresponds to a packed data element position of a destination, and an addition of the results from these multiplications to a full-sized (relative to the N-sized packed data elements) result of a previous iteration (or initial value for the first iteration), wherein M is equal to the full-sized packed data element divided by N and the index of the second source corresponds to the iteration. For example, when M is equal to 2 (e.g., a full-sized packed data element is 16 bits and N is 8 bits), consecutive packed data elements from the first source are multiplied to respective consecutive packed data elements of the second source. The result of the final iteration is stored. In some embodiments, rounding or saturation is performed at each circuit boundary. In the final iteration, the result of the addition is stored in the corresponding packed data element position of the destination.

As such, detailed herein are embodiments of an instruction that when executed, for each packed data element group of the sources of the first type, multiply each packed data element of the packed data element group of the sources of the first type by a corresponding packed data element from a scalar value, wherein the scalar value corresponds to packed data position of the scalar for that source of the first type, add each of the multiplications of the packed data element group of the sources of the first type to generate an iteration result, add to the iteration result the iteration result of the previous iteration or an initial value (and potentially round or saturate), store a final result into a packed data element position of the destination that corresponds to the location of the scalar packed data element, wherein the final result is a summation of all of the iteration results and the initial value For example, detailed herein are embodiments of an instruction that when executed causes, per iteration, multiplication of packed data elements from a first source and a second source (scalar) that correspond to a packed data element position of a destination, and an addition of the results from these multiplications to a result of a previous iteration (or initial value for the first iteration. The result of the final iteration is stored. In some embodiments, rounding or saturation is performed at each circuit boundary. In the final iteration, the result of the addition is stored in the corresponding packed data element position of the destination.

In some embodiments of integer versions of the instruction(s), saturation circuitry is used to preserve a sign of an operand when the addition results in a value that is too big. In particular, the saturation evaluation occurs on the infinite precision result in between the multi-way-add and the write to the destination. There are instances where the largest positive or least negative number cannot be trusted since it may reflect that a calculation exceeded the container space. However, this can at least be checked. When the accumulator is floating point and the input terms are integer, then the question to be answered is how and when is the conversion from the integer products was done such that there is no double-rounding from the partial terms to the final floating point accumulation. In some embodiments, the sum of products and the floating point accumulator are turned into infinite precision values (fixed point numbers of hundreds of bits), the addition is performed, and then a single rounding to the actual accumulator type is performed.

In some embodiments, when the input terms are floating point operands, rounding and dealing with special values (infinities and not a numbers (NANs)), the ordering of faults in the calculation needs solving in the definition. In some embodiments, an order of operations is specified that is emulated and ensures that the implementation delivers faults in that order. It may be impossible for such an implementation to avoid multiple roundings in the course of the calculation. A single precision multiply can fill completely into a double precision result regardless of input values. However, the horizontal addition of two such operations may not fit into a double without rounding, and the sum may not fit the accumulator without an additional rounding. In some embodiments, rounding is performed during the horizontal summation and once during the accumulation.

Figure 3:
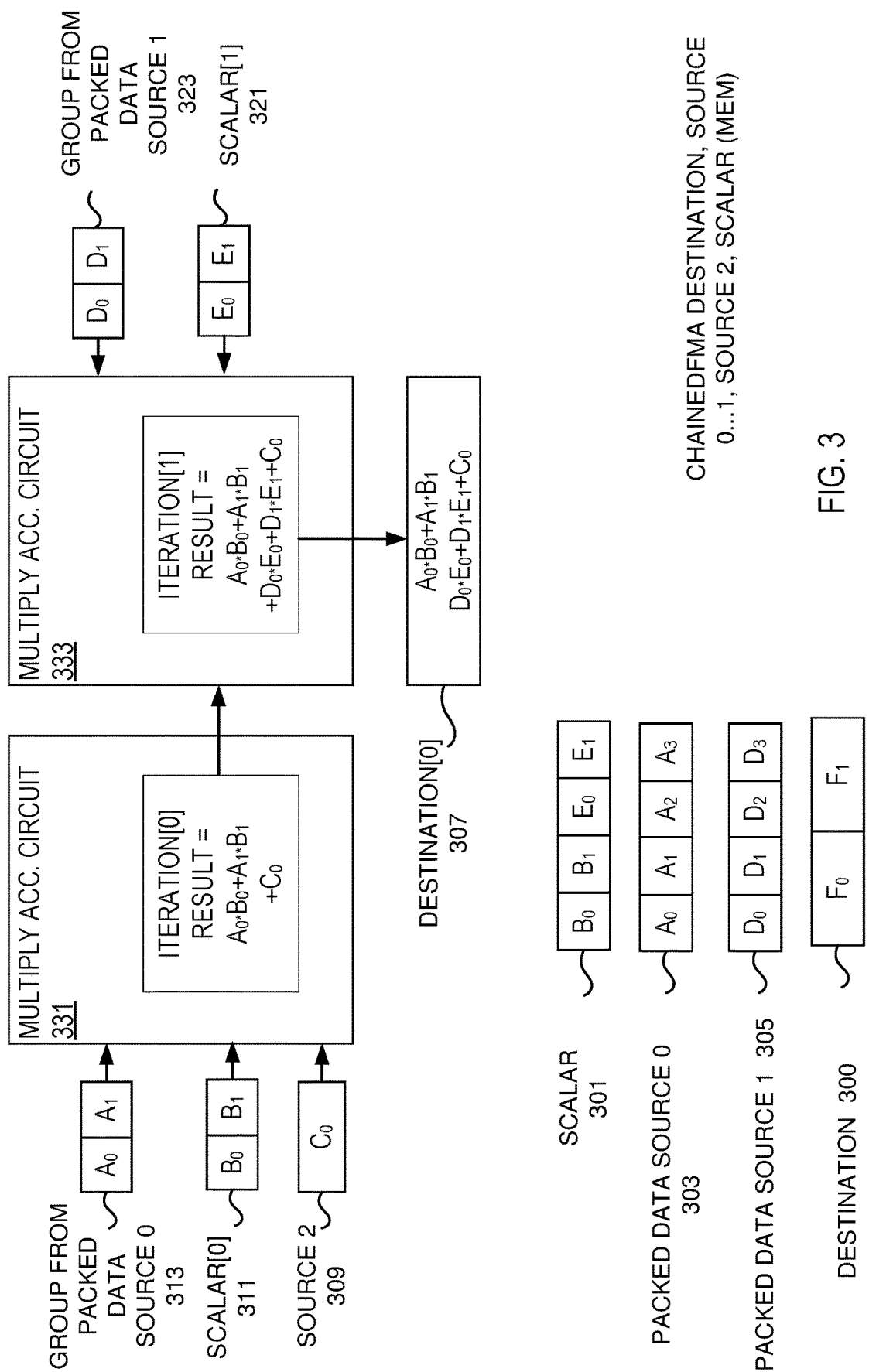
FIG. 3 illustrates an example of part of an execution a chained FMA instruction for one packed data element position of the destination according to an embodiment.

FIG. 3 illustrates an example of part of an execution a chained FMA instruction according to an embodiment. In this example, only the least significant packed data element of the destination is written. As shown, the exemplary instruction (called chainedFMA) has a destination field representing a packed data destination operand, a first source field representing a plurality of packed data source operands that have packed data elements of a first size (here source 0 and source 1), a second source field representing a plurality of packed data source operands that have packed data elements of a second, different size (source 2), and a memory location that stores a scalar value which contains sub-elements. The opcode for the chained FMA instruction would indicate the number of iterations in the chain (and the number of sources of the first type). Typically, the sources and destination are registers, and the scalar is retrieved from memory.

In this illustration, the scalar 301 includes four sub elements ($B_0$, $B_1$, $E_0$, and $E_1$). This scalar comes from a memory location identified in the instruction. These (packed data) sub-elements are of a first size that is the same size as packed data elements of the packed data source 0 303 and packed data source 1 305. Packed data source 0 303 and packed data source 1 305 each have four packed data elements.

The destination 300 and of the second source 309 have less packed data elements than the packed data source 0 303 and packed data source 1 305. However, the packed data elements of the destination 300 and the second source 309 are larger (accumulator size). Examples of the different sizes have been detailed in FIG. 2.

As shown, a group of packed data elements from source 0 313 are multiplied with sub-elements (of the same size) from a packed data element of the scalar 311. The "group" consists of packed data elements that correspond to the packed data element position of the destination and second source that is being processed. In this example, since the data packed data elements of source 0 313 are half the size of the packed data elements of the destination, a group is two packed data elements from positions that align with a single packed data element position of the destination.

The packed data element of the scalar is in a position of the retrieved scalar that corresponds to the iteration such that the first iteration uses packed data elements from a least significant position, etc. The results of these multiplications are added to a corresponding packed data element from the second source (source 2 309) having a different size than the packed data elements of source 0 303. Note that in some embodiments, the second source is the destination 300.

The above discussed operations are performed by multiply accumulator circuit 331 to produce an iteration result. The underlying multipliers and accumulator are not shown in this illustration, however, exemplary circuitry for an iteration of a single packed data element position are illustrated in other figures. In some embodiments, the multiply accumulation circuit 331 performs a saturation or rounding.

The result of the first iteration is passed to another multiply accumulator circuit 333. As shown, a group of packed data elements from source 1 323 are multiplied with packed data elements (of the same size) from a packed data element of the scalar 321. The "group" corresponds to the packed data element position of the destination and second source that is being processed. The packed data element of the scalar is in a position that corresponds to the iteration such that the second iteration uses packed data elements from the second-most least significant position, etc. The result of these multiplications are added to the result from the first iteration. In some embodiments, the multiply accumulation circuit 333 performs a saturation or rounding. The above discussed operations are performed by multiply accumulator circuit 333 to produce an iteration result. As both of the packed data sources of a first type have been evaluated, the result is stored into a corresponding a packed data element position destination 307.

Figure 4:
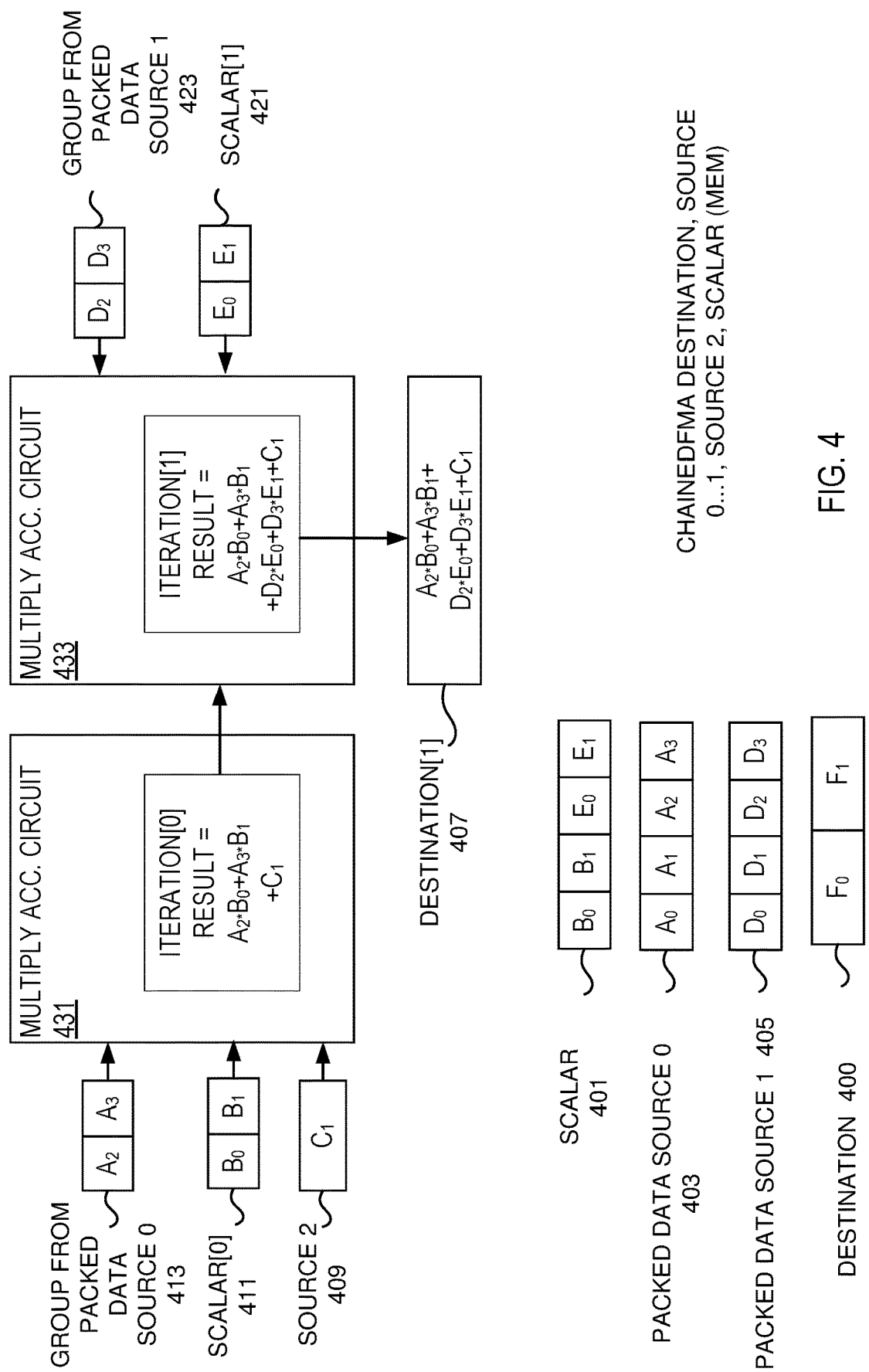
FIG. 4 illustrates an embodiment of part of an execution of a chained FMA instruction for one packed data element position of the destination according to an embodiment.

FIG. 4 illustrates an embodiment of an execution of a chained FMA instruction for one packed data element position of the destination. This example performs the chained FMA on the next "group" of packed data from the sources of the first type. In this illustration, the scalar 401 includes four packed data elements ($B_0$, $B_1$, $E_0$, and $E_1$). This scalar comes from a memory location identified in the instruction. Note that the scalar values are the same. These packed data elements are of a first size that is the same size as packed data elements of the packed data source 0 403 and packed data source 1 405. Packed data source 0 403 and packed data source 1 405 each have four packed data elements.

The destination 400 and of the second source 409 have less packed data elements than the packed data source 0 403 and packed data source 1 405. However, the packed data elements of the destination 400 and the second source 409 are larger (accumulator size).

As shown, a group of packed data elements from source 0 413 are multiplied with packed data elements (of the same size) from a packed data element of the scalar 411. The "group" corresponds to the packed data element position of the destination and second source that is being processed. The packed data element of the scalar is in a position that corresponds to the iteration such that the first iteration uses packed data elements from a least significant position, etc. The result of these multiplications are added to a corresponding packed data element from the second source (source 2 409). Note that in some embodiments, the second source is the destination 400.

The above discussed operations are performed by multiply accumulator circuit 431 to produce an iteration result. The underlying multipliers and accumulator are not shown. In some embodiments, the multiply accumulation circuit 431 performs a saturation or rounding.

The result of the first iteration is passed to another multiply accumulator circuit 433. As shown, a group of packed data elements from source 1 423 are multiplied with packed data elements (of the same size) from a packed data element of the scalar 421. The "group" corresponds to the packed data element position of the destination and second source that is being processed. The packed data element of the scalar is in a position that corresponds to the iteration such that the second iteration uses packed data elements from a second-most least significant position, etc. The result of these multiplications are added to the result from the first iteration. In some embodiments, the multiply accumulation circuit 433 performs a saturation or rounding. The above discussed operations are performed by multiply accumulator circuit 433 to produce an iteration result. As both of the packed data sources of a first type have been evaluated, the result is stored into a corresponding a packed data element position destination 407.

Figure 5:
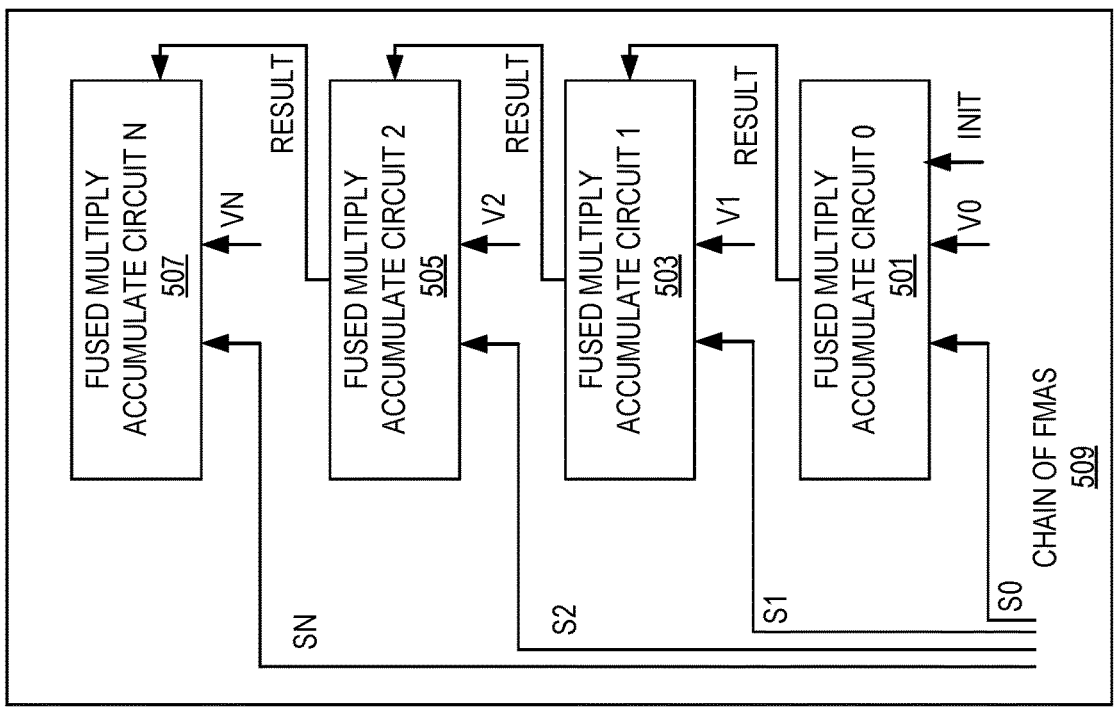
FIG. 5 illustrates an embodiment of a chain of FMA circuits used in a chained fused multiply accumulate.

FIG. 5 illustrates an embodiment of a chain of FMA circuits used in a chained fused multiply accumulate. This high level illustration shows components of a scalar (S0-SN) as inputs into a plurality of fused multiply accumulate circuits 501-507. The position in the scalar of each scalar component corresponds to packed data source (vector) being used. For example, scalar[0] corresponds to vector 0 (V0 in the figure).

As shown, each of the circuits 501-507 receives a portion of the scalar and a vector (V0-VN). The first circuit 501 receives an initial value from a third source (or destination) to be used it its fused multiply-add. The other circuits 503-507 receive the result from the preceding circuit and buffer this result. In some embodiments, saturation or rounding is performed at each circuit boundary.

Figure 6:
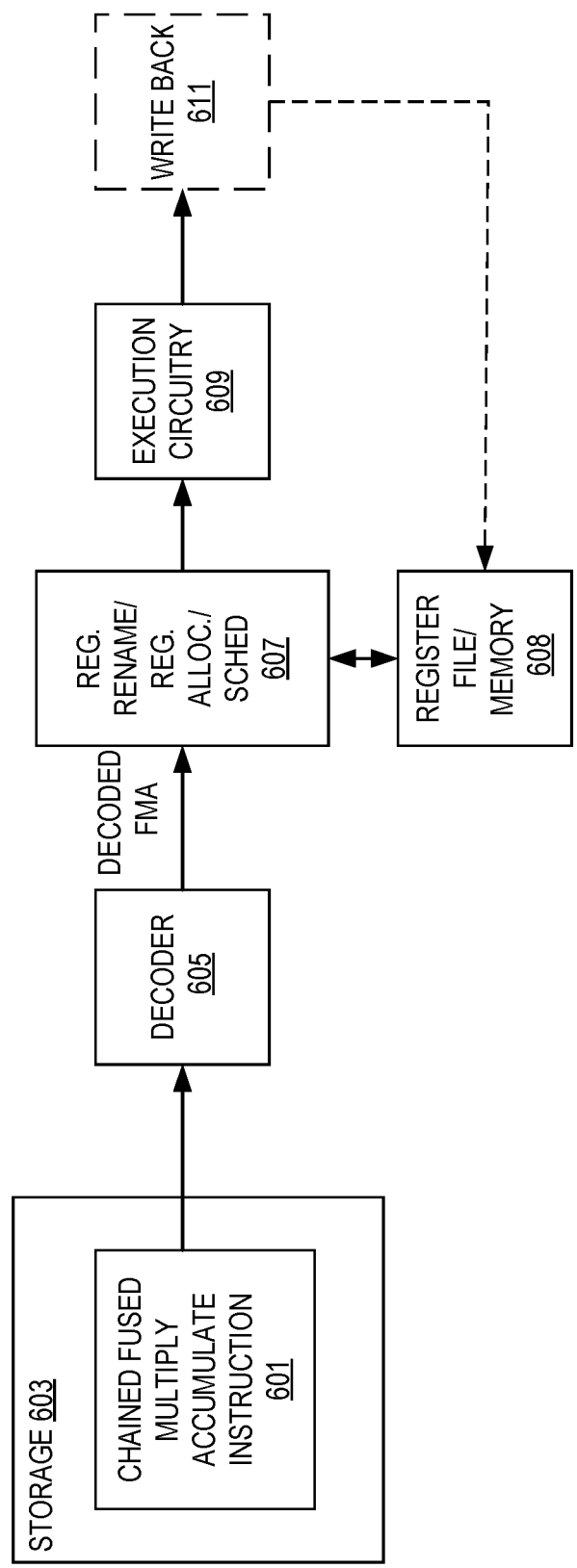
FIG. 6 illustrates an embodiment of exemplary hardware to process an instruction such as a chained fused multiply accumulate instruction.

FIG. 6 illustrates an embodiment of exemplary hardware to process an instruction such as a chained fused multiply accumulate instruction. As illustrated, storage 603 stores a fused multiply accumulate instruction 601.

The instruction 601 is received by decode circuitry 605 (typically from fetch circuitry not shown). For example, the decode circuitry 605 receives this instruction from fetch logic/circuitry. The instruction includes a destination field representing a packed data destination operand, a first source field representing a plurality of packed data source operands that have packed data elements of a first size (here source 0 and source 1), a second source field representing a plurality of packed data source operands that have packed data elements of a second, different size (source 2), and a memory location that stores a scalar value which contains sub-elements. The opcode and/or prefix of the instruction 601 includes an indication of source and destination data element sizes {B/W/D/Q} of byte, word, doubleword, and quadword, and a number of iterations.

More detailed embodiments of at least one instruction format will be detailed later. The decode circuitry 605 decodes the instruction into one or more operations. In some embodiments, this decoding includes generating a plurality of micro-operations to be performed by execution circuitry (such as execution circuitry 611). The decode circuitry 605 also decodes instruction prefixes.

In some embodiments, register renaming, register allocation, and/or scheduling circuitry 607 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments). Registers (register file) and/or memory 608 store data as operands of the instruction to be operated on by execution circuitry 609. Exemplary register types include packed data registers, general purpose registers, and floating point registers.

Execution circuitry 609 executes the decoded instruction such that iterations of packed fused multiply accumulate operations are performed. For example, for each packed data element group of the sources of the first type, multiply each packed data element of the packed data element group of the sources of the first type by a corresponding packed data element from a scalar value, wherein the scalar value corresponds to packed data position of the scalar for that source of the first type, add each of the multiplications of the packed data element group of the sources of the first type to generate an iteration result, add to the iteration result the iteration result of the previous iteration or an initial value (and saturates or rounds the result), store a final result into a packed data element position of the destination that corresponds to the location of the scalar packed data element, wherein the final result is a summation of all of the iteration results and the initial value.

In some embodiments, retirement/write back circuitry 611 architecturally commits the destination register into the registers or memory and retires the instruction.

An embodiment of a format for a fused multiply accumulate instruction is CHAINEDFMA[SOURCESIZE{B/W/D/Q}][ITER][DESTSIZE{B/W/D/Q}]DSTREG, SRC1+(ITERATION NUMBER-1), SRC2, SRC3. In some embodiments, CHAINEDFMA[SOURCESIZE{B/W/D/Q}][ITER][DESTSIZE{B/W/D/Q}] is the opcode and/or a portion of a prefix of the instruction. B/W/D/Q indicates the data element sizes of the sources/destination as byte, word, doubleword, and quadword. DSTREG is a field for the packed data destination register operand. SRC1+(ITERATION NUMBER-1), SRC2, and SRC3 are fields for the sources such as packed data registers and/or memory. ITER is the number of iterations. In particular, SRC1+(ITERATION NUMBER-1) encodes a first packed data element source and, typically, consecutive packed data element sources are used for the iterations (e.g., source 0 for the first iteration, source 1, for the second iteration, etc.). The number of these types of packed data sources is determined from the ITER of the opcode which indicates the number of iterations of the instruction. Note that SRC1, SRC2, and SRC3 do not connote register numbers.

An embodiment of a format for a fused multiply accumulate instruction is CHAINEDFMA[SOURCESIZE{B/W/D/Q}][ITER][DESTSIZE{B/W/D/Q}]DSTREG, SRC1+(ITERATION NUMBER-1), SRC2, SRC3. In some embodiments, CHAINEDFMA[SOURCESIZE{B/W/D/Q}][ITER][DESTSIZE{B/W/D/Q}] is the opcode and/or a portion of a prefix of the instruction. B/W/D/Q indicates the data element sizes of the sources/destination as byte, word, doubleword, and quadword. DSTREG/SRC3 is a field for the packed data destination register operand and a third source operand. ITER is the number of iterations. SRC1+(ITERATION NUMBER-1), SRC2, and SRC3 are fields for the sources such as packed data registers and/or memory. In particular, SRC1+(ITERATION NUMBER-1) encodes a first packed data element source and, typically, consecutive packed data element sources are used for the iterations (e.g., source 0 for the first iteration, source 1, for the second iteration, etc.). The number of these types of packed data sources is determined from the ITER of the opcode which indicates the number of iterations of the instruction. Note that SRC1, SRC2, and SRC3 do not connote register numbers.

In some embodiments, the fused multiply accumulate instruction includes a field for a writemask register operand (k) (e.g., CHAINEDFMA[SOURCESIZE{B/W/D/Q}][ITER][DESTSIZE{B/W/D/C}]{k}DSTREG/SRC3, SRC1+(ITERATION NUMBER-1), SRC2 or CHAINEDFMA[SOURCESIZE{B/W/D/Q}][ITER][DESTSIZE{B/W/D/Q}]{k}DSTREG, SRC1+(ITERATION NUMBER-1), SRC2, SRC3). A writemask is used to conditionally control per-element operations and updating of results. Depending upon the implementation, the writemask uses merging or zeroing masking. Instructions encoded with a predicate (writemask, write mask, or k register) operand use that operand to conditionally control per-element computational operation and updating of result to the destination operand. The predicate operand is known as the opmask (writemask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword (int32), double-precision floating-point (float64), integer quadword (int64). The length of a opmask register, MAX_KL, is sufficient to handle up to 64 elements with one bit per element, i.e. 64 bits. For a given vector length, each instruction accesses only the number of least significant mask bits that are needed based on its data type. An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2). a destination element is not updated with the result of the operation if the corresponding writemask bit is not set. Instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be an XMM register (vm32x), a YMM register (vm32y), or a ZMM register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be an XMM register (vm64x), a YMM register (vm64y) or a ZMM register (vm64z).

FIG. 7 illustrates an embodiment of method performed by a processor to process a chained fused multiply accumulate instruction. For example, the hardware detailed herein is used.

At 701, an instruction is fetched. For example, a chained fused multiply accumulate instruction is fetched. The chained fused multiply accumulate instruction includes an opcode (and in some embodiment a prefix), a destination field representing a destination operand, a first source field representing a plurality of packed data source operands of a first type that have packed data elements of a first size, a second source field representing a plurality of packed data source operands that have packed data elements of a second size, and a field for a memory location that stores a scalar (made of a plurality of scalar sub-element values). In some embodiments, the chained fused multiply accumulate instruction includes a writemask operand. In some embodiments, the instruction is fetched from an instruction cache.

The fetched instruction is decoded at 703. For example, the fetched fused multiply accumulate instruction is decoded by decode circuitry such as that detailed herein.

Data values associated with the source operands of the decoded instruction are retrieved at 705. Additionally, in some embodiments, the instruction is scheduled.

At 707, the decoded instruction is executed by execution circuitry (hardware), such as that detailed herein, to, for each packed data element position of the destination, perform iterations of packed fused multiply accumulate operations by multiplying packed data elements of the sources of the first type by sub-elements of the scalar value, and adding the results of these multiplications to either an initial value (first iteration) or a result from a previous iteration. For example, in some embodiments, for each packed data element group of the sources of the first type, multiply each packed data element of the packed data element group of the sources of the first type by a corresponding packed data element from a scalar value, wherein the scalar value corresponds to packed data position of the scalar for that source of the first type, add each of the multiplications of the packed data element group of the sources of the first type to generate an iteration result, add to the iteration result an iteration result of the previous iteration or an initial value (and saturates or rounds the result), store a final result into a packed data element position of the destination that corresponds to the location of the scalar packed data element, wherein the final result is a summation of all of the iteration results and the initial value. Additionally, in some embodiments, rounding and/or saturation are performed at each addition.

In some embodiment, the instruction is committed or retired at 709.

Figure 8:
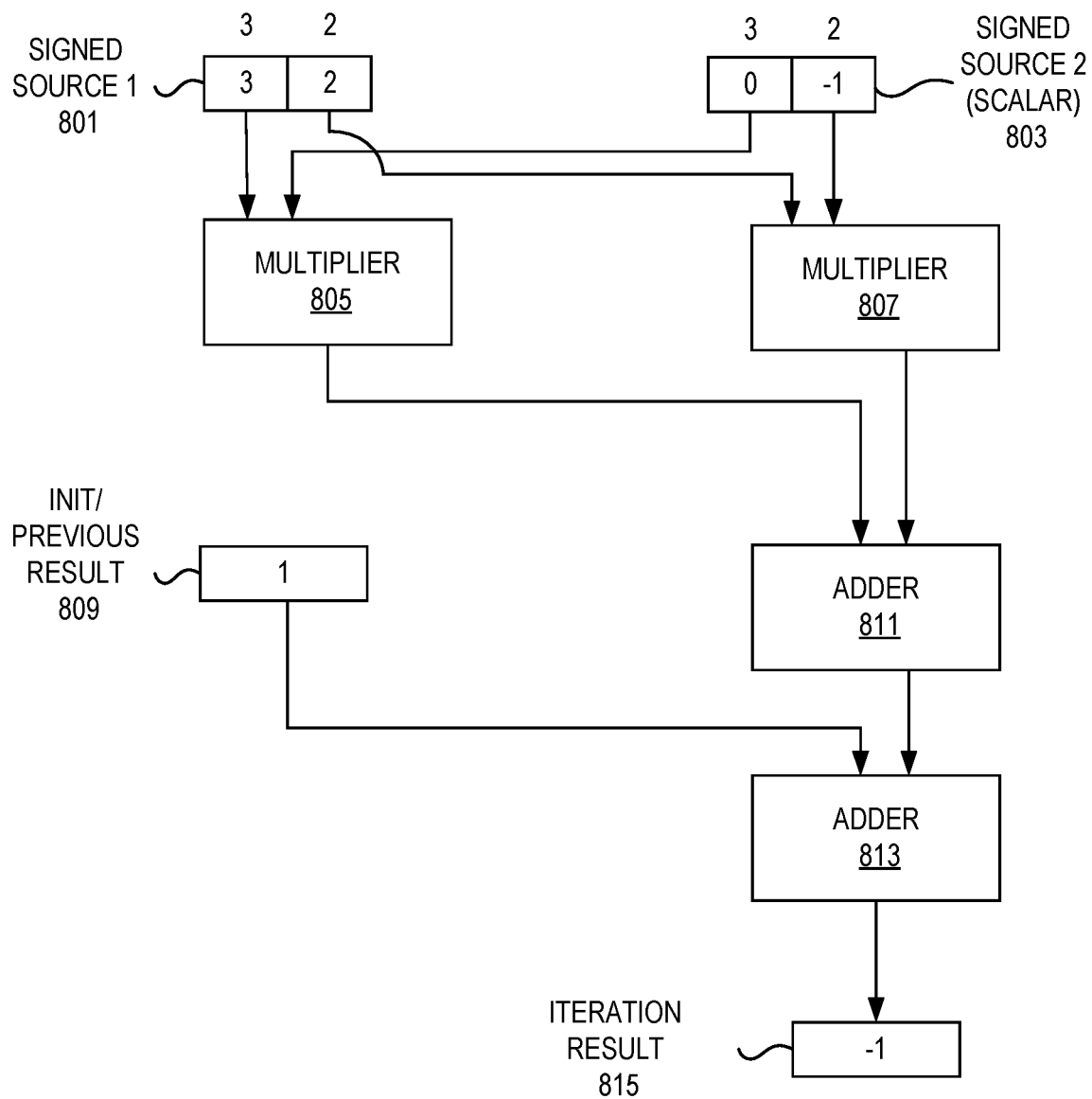
FIG. 8 illustrates an embodiment of a subset of the execution of an iteration of a chained fused multiply accumulate instruction.

FIG. 8 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2x the input data size.

A first signed source (source 1 801) and a second signed source (source 2 (scalar) 803) each have four packed data elements. Each of these packed data elements stores signed data such as floating point data. A third signed source (source 3 809) has two packed data elements of which each stores signed data. The sizes of the first and second signed sources 801 and 803 are half that of the third signed source (initial value or previous result) 809. For example, the first and second signed sources 801 and 803 could have 32-bit packed data elements (e.g., single precision floating point) the third signed source 809 could have 64-bit packed data elements (e.g., double precision floating point).

In this illustration, only the two most significant packed data element positions of the first and second signed sources 801 and 803 and the most significant packed data element position of the third signed source 809 are shown. Of course, the other packed data element positions would also be processed.

As illustrated, packed data elements are processed in pairs. For example, the data of the most significant packed data element positions of the first and second signed sources 801 and 803 are multiplied using a multiplier circuit 805, and the data from second most significant packed data element positions of the first and second signed sources 801 and 803 are multiplied using a multiplier circuit 807. In some embodiments, these multiplier circuits 805 and 807 are reused for other packed data elements positions. In other embodiments, additional multiplier circuits are used so that the packed data elements are processed in parallel. In some contexts, parallel execution is done using lanes that are the size of the signed third source 809. The results of each of the multiplications are added using addition circuitry 811.

The result of the addition of the results of the multiplications is added to the data from most significant packed data element position of the signed source 3 809 (using a different adder 813 or the same adder 811).

Finally, the result of the second addition is either stored into the signed destination 815 in a packed data element position that corresponds to the packed data element positon used from the signed third source 809, or passed on to the next iteration if there is one. In some embodiments, a writemask is applied to this storage such that if a corresponding writemask (bit) is set, the storage happens, and, if not set, the storage does not happen.

Figure 9:
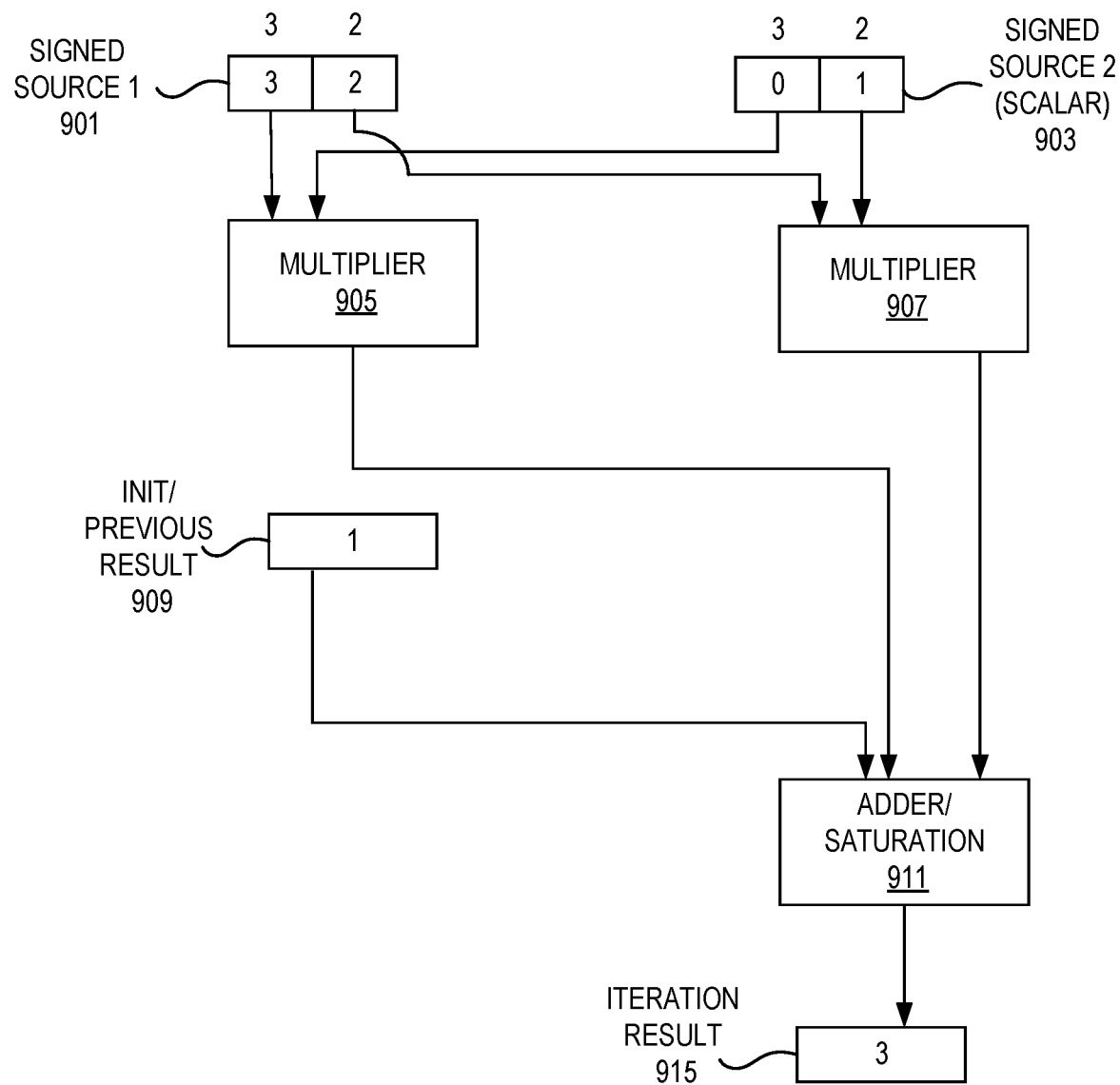
FIG. 9 illustrates an embodiment of a subset of the execution of an iteration of a chained fused multiply accumulate instruction.

FIG. 9 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on signed sources wherein the accumulator is 2x the input data size.

A first signed source (source 1 901) and a second signed source (source 2 (scalar) 903) each have four packed data elements. Each of these packed data elements stores signed data such as integer data. A third signed source (source 3 909) has two packed data elements of which each stores signed data. The sizes of the first and second signed sources 901 and 903 are half that of the third signed source 909. For example, the first and second signed sources 901 and 903 could have 32-bit packed data elements (e.g., single precision floating point) the third signed source 909 could have 64-bit packed data elements (e.g., double precision floating point).

In this illustration, only the two most significant packed data element positions of the first and second signed sources 901 and 903 and the most significant packed data element position of the third signed source 909 are shown. Of course, the other packed data element positions would also be processed.

As illustrated, packed data elements are processed in pairs. For example, the data of the most significant packed data element positions of the first and second signed sources 901 and 903 are multiplied using a multiplier circuit 905, and the data from second most significant packed data element positions of the first and second signed sources 901 and 903 are multiplied using a multiplier circuit 907. In some embodiments, these multiplier circuits 905 and 907 are reused for other packed data elements positions. In other embodiments, additional multiplier circuits are used so that the packed data elements are processed in parallel. In some contexts, parallel execution is done using lanes that are the size of the signed third source (initial value or previous iteration result) 909. The results of each of the multiplications are added to the signed third source 909 using addition/saturation circuitry 911.

Addition/saturation (accumulator) circuitry 911 preserves a sign of an operand when the addition results in a value that is too big. In particular, saturation evaluation occurs on the infinite precision result between the multi-way-add and the write to the destination or next iteration. When the accumulator 911 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result of the addition and saturation check is stored into the signed result 915 in a packed data element position that corresponds to the packed data element positon used from the signed third source 909, or passed on to the next iteration if there is one. In some embodiments, a writemask is applied to this storage such that if a corresponding writemask (bit) is set, the storage happens, and, if not set, the storage does not happen.

Figure 10:
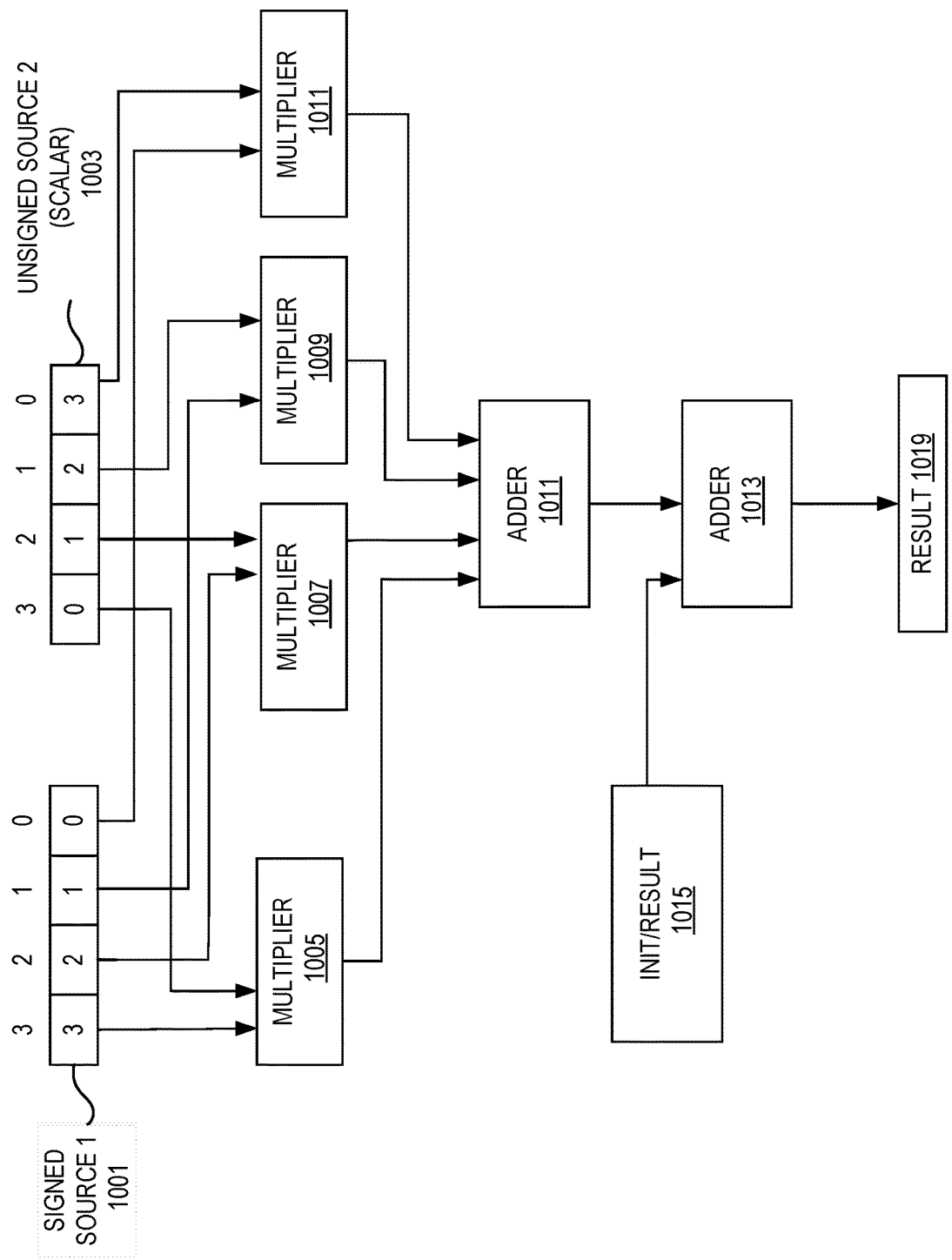
FIG. 10 illustrates an embodiment of a subset of the execution of an iteration of a chained fused multiply accumulate instruction.

FIG. 10 illustrates an embodiment of a subset of the execution of an iteration of a chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4x the input data size.

A first signed source (source 1 1001) and a second unsigned source (source 2 (scalar) 1003) each have four packed data elements. Each of these packed data elements has data such as floating point or integer data. A third signed source (initial value or result 1015) has a packed data element of which stores signed data. The sizes of the first and second sources 1001 and 1003 are a quarter of the third signed source 1015. For example, the first and second sources 1001 and 1003 could have 16-bit packed data elements (e.g., word) and the third signed source 1015 could have 64-bit packed data elements (e.g., double precision floating point or 64-bit integer).

In this illustration, the four most significant packed data element positions of the first and second sources 1001 and 1003 and the most significant packed data element position of the third signed source 1015 are shown. Of course, other packed data element positions would also be processed if there are any.

As illustrated, packed data elements are processed in quadruplets. For example, the data of the most significant packed data element positions of the first and second sources 1001 and 1003 are multiplied using a multiplier circuit 1007, data from second most significant packed data element positions of the first and second sources 1001 and 1003 are multiplied using a multiplier circuit 1007, data from third most significant packed data element positions of the first and second sources 1001 and 1003 are multiplied using a multiplier circuit 1009, and data from the least significant packed data element positions of the first and second sources 1001 and 1003 are multiplied using a multiplier circuit 1011. In some embodiments, the signed packed data elements of the first source 1001 are sign extended and the unsigned packed data elements of the second source 1003 are zero extended prior to the multiplications.

In some embodiments, these multiplier circuits 1005-1011 are reused for other packed data elements positions. In other embodiments, additional multiplier circuits are used so that the packed data elements are processed in parallel. In some contexts, parallel execution is done using lanes that are the size of the signed third source 1015. The results of each of the multiplications are added using addition circuitry 1011.

The result of the addition of the results of the multiplications is added to the data from most significant packed data element position of the signed source 3 1015 (using a different adder 1013 or the same adder 1011).

Finally, the result 1019 of the second addition is either stored into the signed destination in a packed data element position that corresponds to the packed data element positon used from the signed third source 1015, or passed to the next iteration. In some embodiments, a writemask is applied to this storage such that if a corresponding writemask (bit) is set, the storage happens, and, if not set, the storage does not happen.

Figure 11:
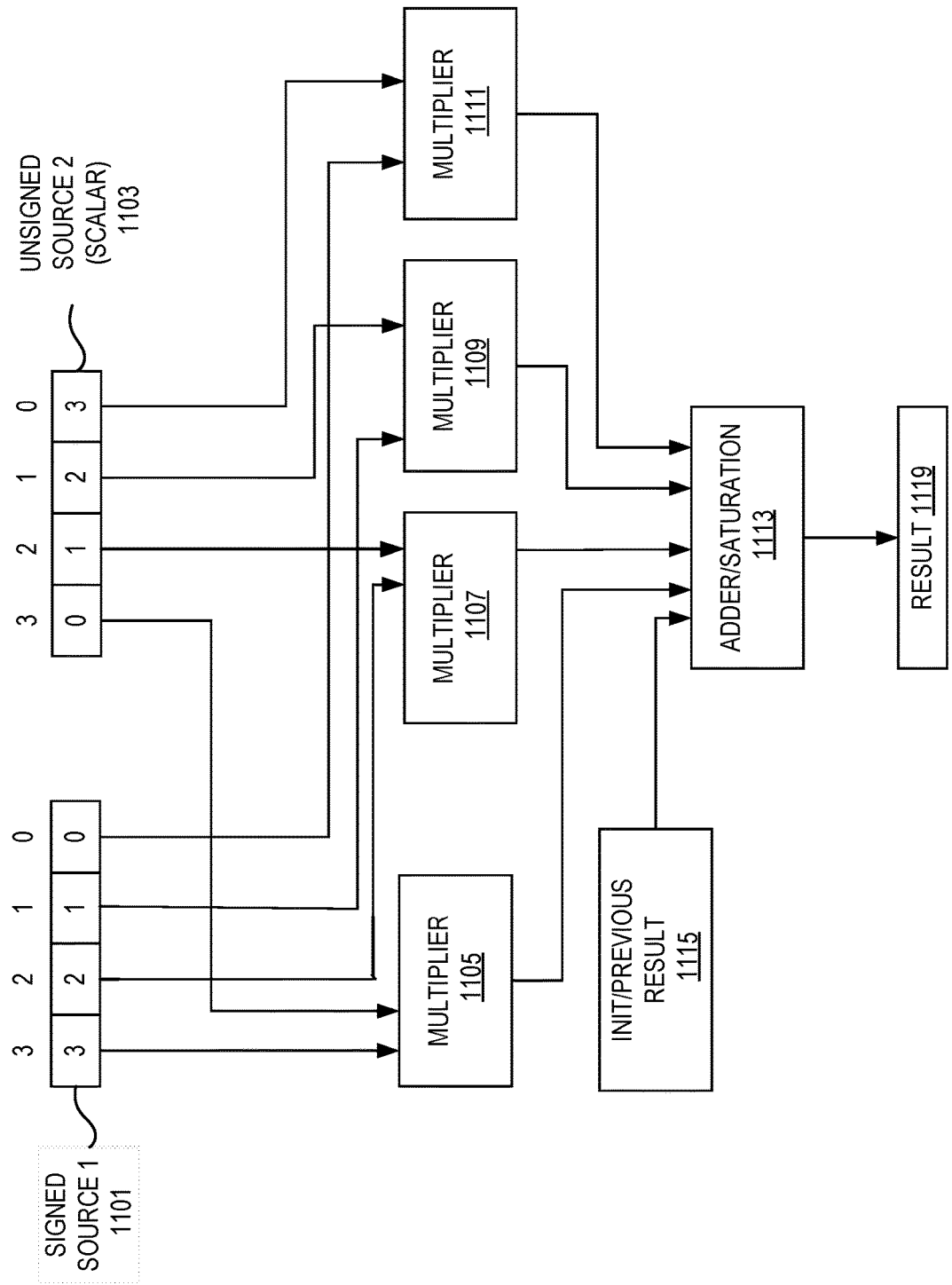
FIG. 11 illustrates an embodiment of a subset of the execution of an iteration of chained fused multiply accumulate instruction.

FIG. 11 illustrates an embodiment of a subset of the execution of an iteration of chained fused multiply accumulate instruction. In particular, this illustrates execution circuitry of an iteration of one packed data element position of the destination. In this embodiment, the chained fused multiply accumulate is operating on a signed source and an unsigned source wherein the accumulator is 4x the input data size.

A first signed source (source 1 1101) and a second unsigned source (source 2 (scalar) 1103) each have four packed data elements. Each of these packed data elements stores data such as floating point or integer data. A third signed source (initial or previous result 1115) has a packed data element of which stores signed data. The sizes of the first and second sources 1101 and 1103 are a quarter of the third signed source 1115. For example, the first and second sources 1101 and 1103 could have 16-bit packed data elements (e.g., word) and the third signed source 1115 could have 64-bit packed data elements (e.g., double precision floating point or 64-bit integer).

In this illustration, the four most significant packed data element positions of the first and second sources 1101 and 1103 and the most significant packed data element position of the third signed source 1115 are shown. Of course, other packed data element positions would also be processed if there are any.

As illustrated, packed data elements are processed in quadruplets. For example, the data of the most significant packed data element positions of the first and second sources 1101 and 1103 are multiplied using a multiplier circuit 1107, data from second most significant packed data element positions of the first and second sources 1101 and 1103 are multiplied using a multiplier circuit 1107, data from third most significant packed data element positions of the first and second sources 1101 and 1103 are multiplied using a multiplier circuit 1109, and data from the least significant packed data element positions of the first and second sources 1101 and 1103 are multiplied using a multiplier circuit 1111. In some embodiments, the signed packed data elements of the first source 1101 are sign extended and the unsigned packed data elements of the second source 1103 are zero extended prior to the multiplications.

In some embodiments, these multiplier circuits 1105-1111 are reused for other packed data elements positions. In other embodiments, additional multiplier circuits are used so that the packed data elements are processed in parallel. In some contexts, parallel execution is done using lanes that are the size of the signed third source 1115. The result of the addition of the results of the multiplications is added to the data from most significant packed data element position of the signed source 3 1115 using addition/saturation circuitry 1113.

Addition/saturation (accumulator) circuitry 1113 preserves a sign of an operand when the addition results in a value that is too big. In particular, saturation evaluation occurs on the infinite precision result between the multi-way-add and the write to the destination. When the accumulator 1113 is floating point and the input terms are integer, the sum of products and the floating point accumulator input value are turned into infinite precision values (fixed point numbers of hundreds of bits), the addition of the multiplication results and the third input is performed, and a single rounding to the actual accumulator type is performed.

The result 1119 of the addition and saturation check is stored into the signed destination in a packed data element position that corresponds to the packed data element positon used from the signed third source 915, or passed to the next iteration. In some embodiments, a writemask is applied to this storage such that if a corresponding writemask (bit) is set, the storage happens, and, if not set, the storage does not happen.

The figures below detail exemplary architectures and systems to implement embodiments of the above. In some embodiments, one or more hardware components and/or instructions described above are emulated as detailed below, or implemented as software modules.

Exemplary embodiments include a processor comprising a decoder that decodes a single instruction having an opcode, a destination field representing a destination operand, a first source field representing a plurality of packed data source operands of a first type that have packed data elements of a first size, a second source field representing a plurality of packed data source operands that have packed data elements of a second size, and a field for a memory location that stores a scalar value; a register file having a plurality of packed data registers including registers for the plurality of packed data source operands that have packed data elements of a first size, the source operands that have packed data elements of a second size, and the destination operand; and execution circuitry that executes the decoded single instruction to perform iterations of packed fused multiply accumulate operations by multiplying packed data elements of the sources of the first type by sub-elements of the scalar value, and adding results of these multiplications to an initial value in a first iteration and a result from a previous iteration in subsequent iterations.

In some embodiments, one or more of the following apply: the instruction defines the first size and the second size, and the second size is a multiple of two of the first size; the execution circuitry performs the packed fused multiply accumulate operations by, for each packed data element group of the sources of the first type, multiply each packed data element of the packed data element group of the sources of the first type by a corresponding packed data sub-element from the scalar value, wherein the scalar value corresponds to packed data position of the scalar for that source of the first type, add each of the multiplications of the packed data element group of the sources of the first type to generate an iteration result, add to the iteration result an iteration result of the previous iteration or an initial value, and store a final result into a packed data element position of the destination that corresponds to the location of the scalar packed data element, wherein the final result is a summation of all of the iteration results and the initial value; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; when the first size is a quarter of the second size, a single addition and saturation check is performed on each of the multiplications a result from a previous iteration.

Exemplary embodiments include a method comprising decoding a single instruction having an opcode, a destination field representing a destination operand, a first source field representing a plurality of packed data source operands of a first type that have packed data elements of a first size, a second source field representing a plurality of packed data source operands that have packed data elements of a second size, and a field for a memory location that stores a scalar value; and executing the decoded single instruction to perform iterations of packed fused multiply accumulate operations by multiplying packed data elements of the sources of the first type by sub-elements of the scalar value, and adding results of these multiplications to an initial value in a first iteration and a result from a previous iteration in subsequent iterations.

In some embodiments, one or more of the following apply: the instruction defines the first size and the second size, and the second size is a multiple of two of the first size; the execution circuitry performs the packed fused multiply accumulate operations by, for each packed data element group of the sources of the first type, multiply each packed data element of the packed data element group of the sources of the first type by a corresponding packed data sub-element from the scalar value, wherein the scalar value corresponds to packed data position of the scalar for that source of the first type, add each of the multiplications of the packed data element group of the sources of the first type to generate an iteration result, add to the iteration result an iteration result of the previous iteration or an initial value, and store a final result into a packed data element position of the destination that corresponds to the location of the scalar packed data element, wherein the final result is a summation of all of the iteration results and the initial value; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; when the first size is a quarter of the second size, a single addition and saturation check is performed on each of the multiplications a result from a previous iteration.

Exemplary embodiments include a non-transitory machine-readable medium storing an instruction, which when executed to cause: decoding a single instruction having an opcode, a destination field representing a destination operand, a first source field representing a plurality of packed data source operands of a first type that have packed data elements of a first size, a second source field representing a plurality of packed data source operands that have packed data elements of a second size, and a field for a memory location that stores a scalar value; and executing the decoded single instruction to perform iterations of packed fused multiply accumulate operations by multiplying packed data elements of the sources of the first type by sub-elements of the scalar value, and adding results of these multiplications to an initial value in a first iteration and a result from a previous iteration in subsequent iterations.

In some embodiments, one or more of the following apply: the instruction defines the first size and the second size, and the second size is a multiple of two of the first size; the execution circuitry performs the packed fused multiply accumulate operations by, for each packed data element group of the sources of the first type, multiply each packed data element of the packed data element group of the sources of the first type by a corresponding packed data sub-element from the scalar value, wherein the scalar value corresponds to packed data position of the scalar for that source of the first type, add each of the multiplications of the packed data element group of the sources of the first type to generate an iteration result, add to the iteration result an iteration result of the previous iteration or an initial value, and store a final result into a packed data element position of the destination that corresponds to the location of the scalar packed data element, wherein the final result is a summation of all of the iteration results and the initial value; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; when the first size is a quarter of the second size, a single addition and saturation check is performed on each of the multiplications a result from a previous iteration.

Exemplary embodiments include a system including memory and a processor, the processor comprising a decoder that decodes a single instruction having an opcode, a destination field representing a destination operand, a first source field representing a plurality of packed data source operands of a first type that have packed data elements of a first size, a second source field representing a plurality of packed data source operands that have packed data elements of a second size, and a field for a memory location that stores a scalar value; a register file having a plurality of packed data registers including registers for the plurality of packed data source operands that have packed data elements of a first size, the source operands that have packed data elements of a second size, and the destination operand; and execution circuitry that executes the decoded single instruction to perform iterations of packed fused multiply accumulate operations by multiplying packed data elements of the sources of the first type by sub-elements of the scalar value, and adding results of these multiplications to an initial value in a first iteration and a result from a previous iteration in subsequent iterations.

In some embodiments, one or more of the following apply: the instruction defines the first size and the second size, and the second size is a multiple of two of the first size; the execution circuitry performs the packed fused multiply accumulate operations by, for each packed data element group of the sources of the first type, multiply each packed data element of the packed data element group of the sources of the first type by a corresponding packed data sub-element from the scalar value, wherein the scalar value corresponds to packed data position of the scalar for that source of the first type, add each of the multiplications of the packed data element group of the sources of the first type to generate an iteration result, add to the iteration result an iteration result of the previous iteration or an initial value, and store a final result into a packed data element position of the destination that corresponds to the location of the scalar packed data element, wherein the final result is a summation of all of the iteration results and the initial value; when the first size is half of the second size, a first addition is performed on each of the multiplications and a second addition is performed on a result of the first addition and a result from a previous iteration; when the first size is half of the second size, a single addition and saturation check is performed on each of the multiplications a result from a previous iteration; when the first size is a quarter of the second size, a first addition is performed on each of the multiplications and a second addition is performed on a result of the first addition and a result from a previous iteration; when the first size is a quarter of the second size, a single addition and saturation check is performed on each of the multiplications a result from a previous iteration.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
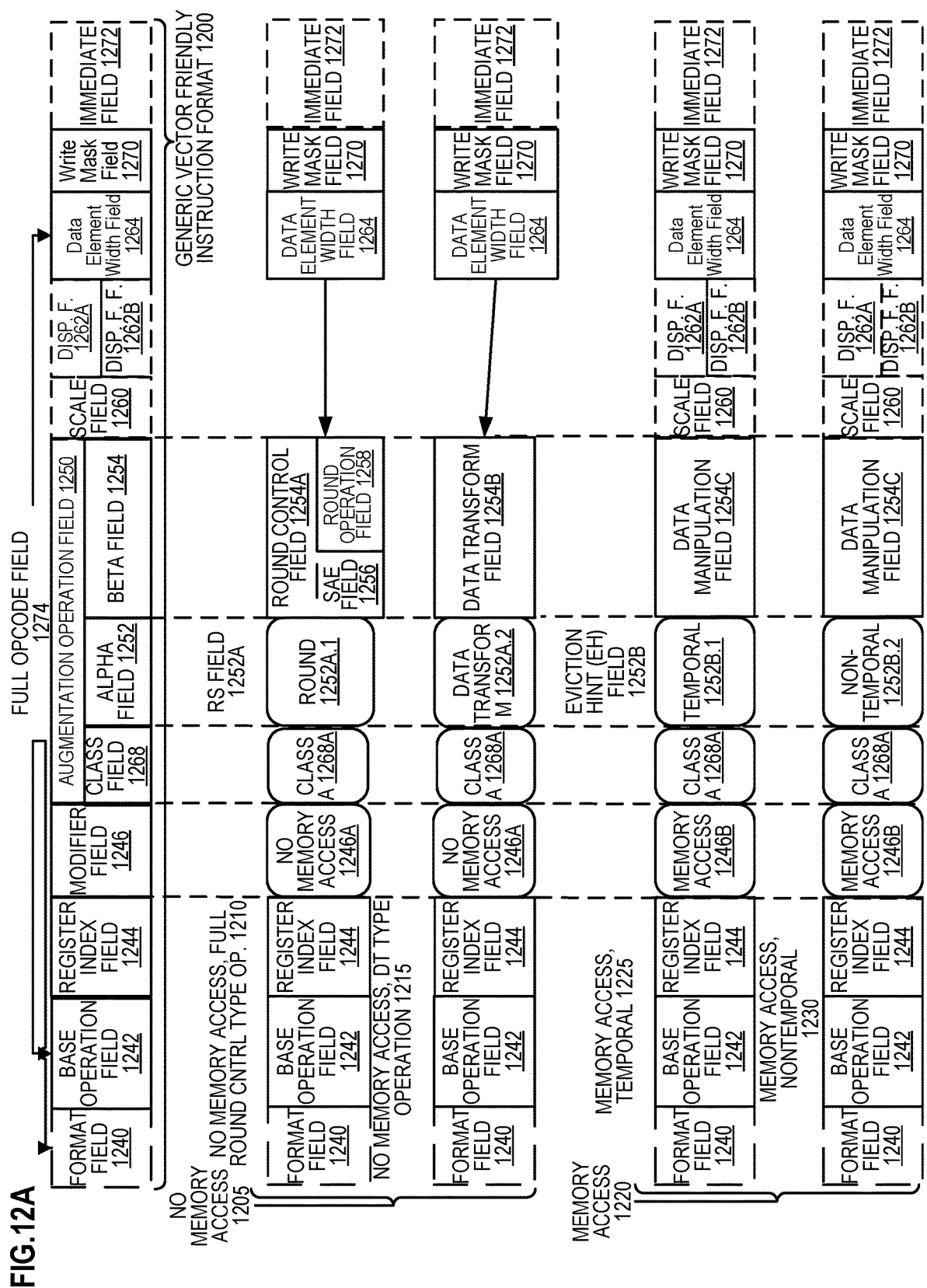
FIG. 12A is a block diagram illustrating a generic vector friendly instruction format and class A instruction templates thereof according to embodiments of the invention.
Figure 12B:
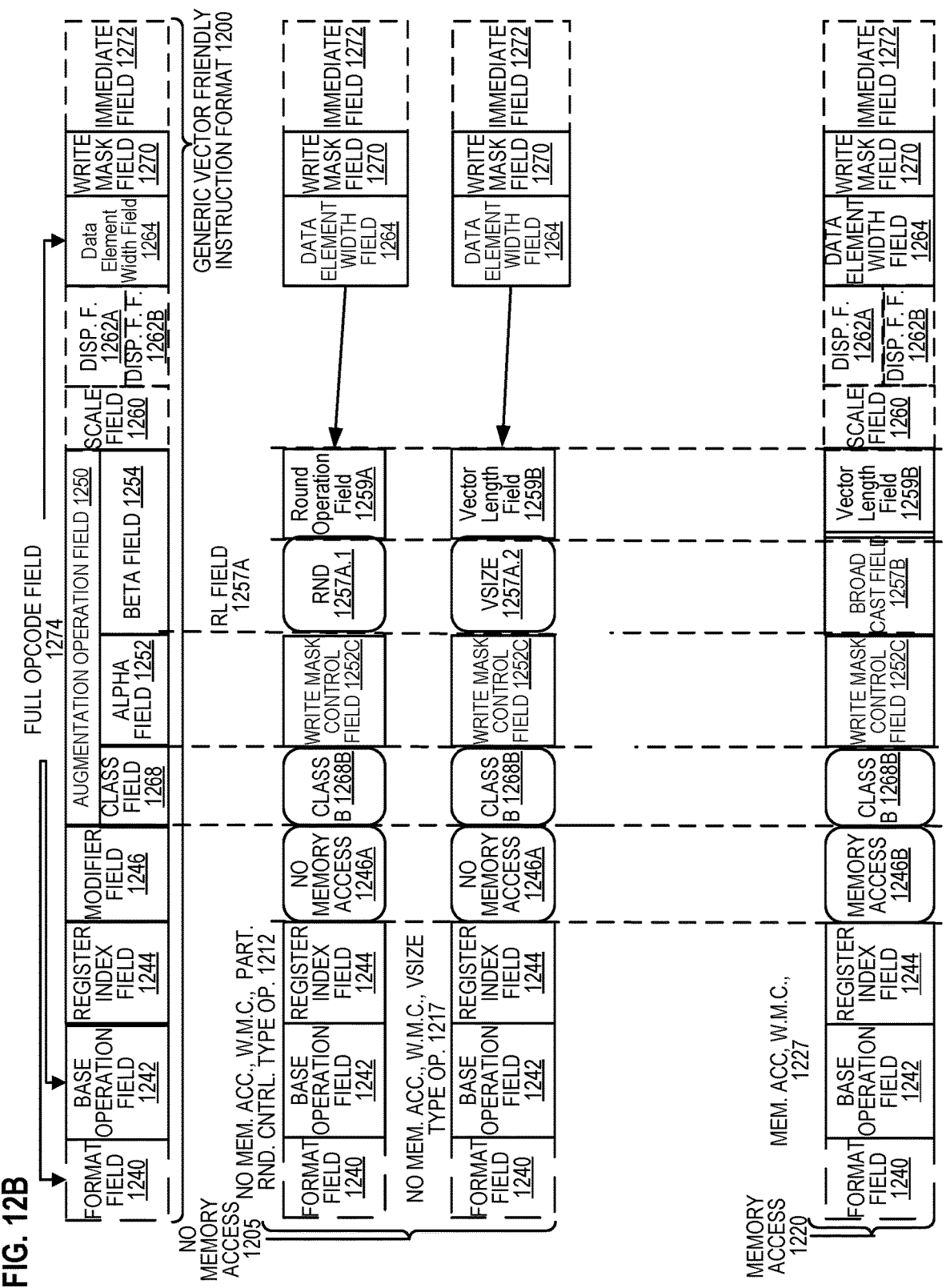
FIG. 12B is a block diagram illustrating the generic vector friendly instruction format and class B instruction templates thereof according to embodiments of the invention.

FIGS. 12A-12B are block diagrams illustrating a generic vector friendly instruction format and instruction templates thereof according to embodiments of the invention. FIG. 12A is a block diagram illustrating a generic vector friendly instruction format and class A instruction templates thereof according to embodiments of the invention; while FIG. 12B is a block diagram illustrating the generic vector friendly instruction format and class B instruction templates thereof according to embodiments of the invention. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access from those that do not; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the invention, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}$*index+base).

Displacement Field 1262A—its content is used as part of memory address generation (e.g., for address generation that uses $2^{scale}$*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the invention are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale filed 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the invention the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the invention where a processor includes a control register for specifying rounding modes, the round operation control field's 1250 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale filed 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the invention where a processor includes a control register for specifying rounding modes, the round operation control field's 1250 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13A is a block diagram illustrating an exemplary specific vector friendly instruction format according to embodiments of the invention. FIG. 13A shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13A map are illustrated.

It should be understood that, although embodiments of the invention are described with reference to the specific vector friendly instruction format 1300 in the context of the generic vector friendly instruction format 1200 for illustrative purposes, the invention is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the invention is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits[7:0])—the first byte (EVEX Byte 0) is the format field 1240 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]-R), EVEX.X bit field (EVEX byte 1, bit [6]-X), and 1257BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]-mmmm)—its content encodes an implied leading opcode byte (0F, 0F 38, or 0F 3).

Data element width field 1264 (EVEX byte 2, bit [7]-W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (1s complement) form. Depending on the instruction, an extra different EVEX bit field is used to extend the specifier size to 32 registers.

EVEX.0 1268 Class field (EVEX byte 2, bit [2]-U)—If EVEX.0=0, it indicates class A or EVEX.U0; if EVEX.0=1, it indicates class B or EVEX.U1.

Prefix encoding field 1325 (EVEX byte 2, bits [1:0]-pp)— provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1254 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Figure 13D:
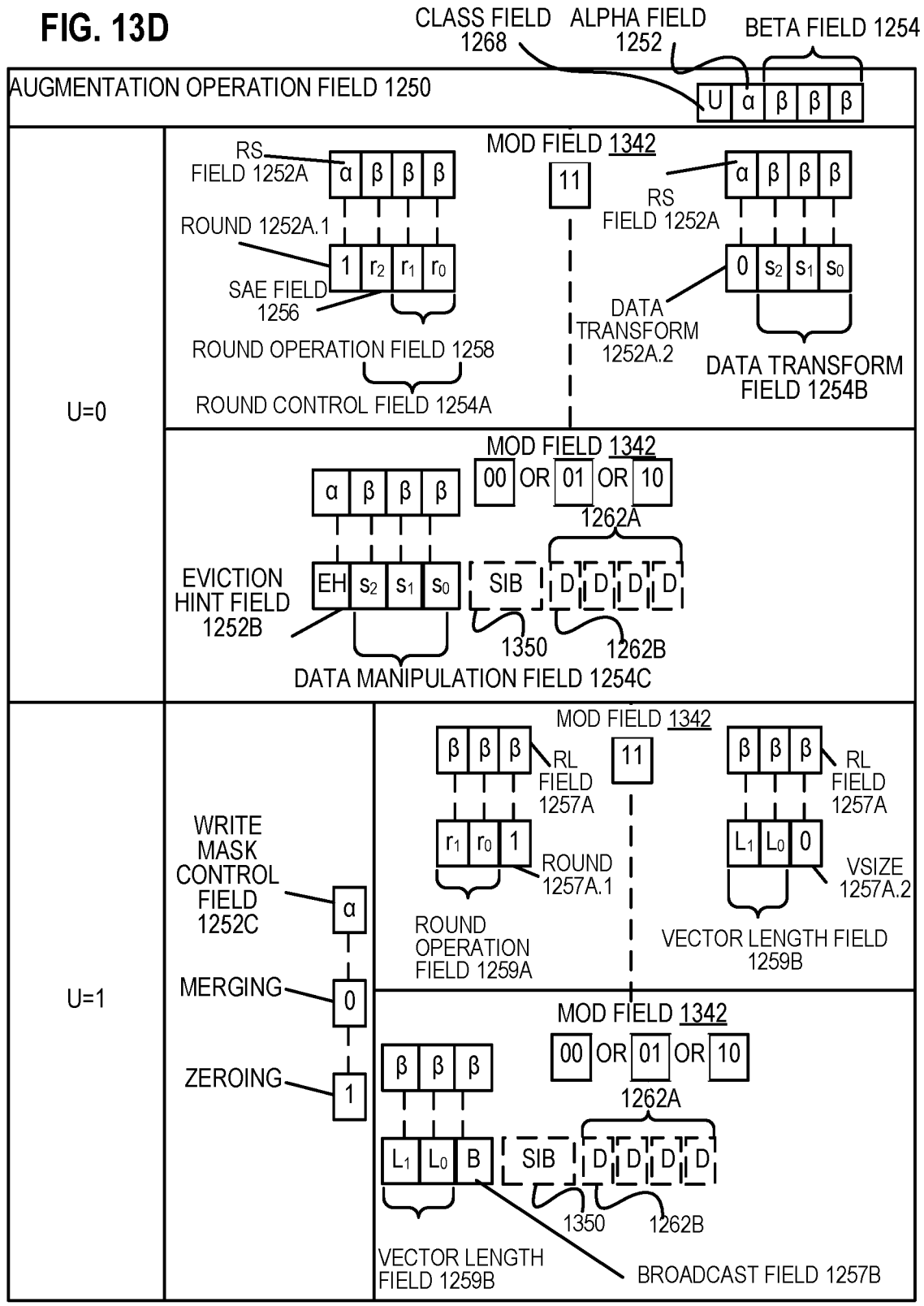
FIG. 13D is a block diagram illustrating the fields of the specific vector friendly instruction format 1300 that make up the augmentation operation field 1250 according to one embodiment of the invention.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.
Full Opcode Field FIG. 13B is a block diagram illustrating the fields of the specific vector friendly instruction format 1300 that make up the full opcode field 1274 according to one embodiment of the invention. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.
Register Index Field FIG. 13C is a block diagram illustrating the fields of the specific vector friendly instruction format 1300 that make up the register index field 1244 according to one embodiment of the invention. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.
Augmentation Operation Field FIG. 13D is a block diagram illustrating the fields of the specific vector friendly instruction format 1300 that make up the augmentation operation field 1250 according to one embodiment of the invention. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]-EH) is interpreted as the rs field 1252A. When the rs field 1252A contains a 1 (round 1252A.1), the beta field 1254 (EVEX byte 3, bits [6:4]-SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]-SSS) is interpreted as a three bit data transform field 1254B. When U=0 and the MOD field 1342 contains 00, 01, or 10 (signifying a memory access operation), the alpha field 1252 (EVEX byte 3, bit [7]-EH) is interpreted as the eviction hint (EH) field 1252B and the beta field 1254 (EVEX byte 3, bits [6:4]-SSS) is interpreted as a three bit data manipulation field 1254C.

When U=1, the alpha field 1252 (EVEX byte 3, bit [7]-EH) is interpreted as the write mask control (Z) field 1252C. When U=1 and the MOD field 1342 contains 11 (signifying a no memory access operation), part of the beta field 1254 (EVEX byte 3, bit [4]-$S_0$) is interpreted as the RL field 1257A; when it contains a 1 (round 1257A.1) the rest of the beta field 1254 (EVEX byte 3, bit [6-5]-$S_{2-1}$) is interpreted as the round operation field 1259A, while when the RL field 1257A contains a 0 (VSIZE 1257.A2) the rest of the beta field 1254 (EVEX byte 3, bit [6-5]-$S_{2-1}$) is interpreted as the vector length field 1259B (EVEX byte 3, bit [6-5]-$L_{1-0}$). When U=1 and the MOD field 1342 contains 00, 01, or 10 (signifying a memory access operation), the beta field 1254 (EVEX byte 3, bits [6:4]-SSS) is interpreted as the vector length field 1259B (EVEX byte 3, bit [6-5]-$L_{1-0}$) and the broadcast field 1257B (EVEX byte 3, bit [4]-B).
Exemplary Register Architecture FIG. 14 is a block diagram of a register architecture 1400 according to one embodiment of the invention. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259B | B (FIG. 12B; U = 1) | 1217, 1227 | zmm, ymm, or xmm registers (the vector length is 64 byte, 32 byte, or 16 byte) depending on the vector length field 1259B |

In other words, the vector length field 1259B selects between a maximum length and one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 16B:
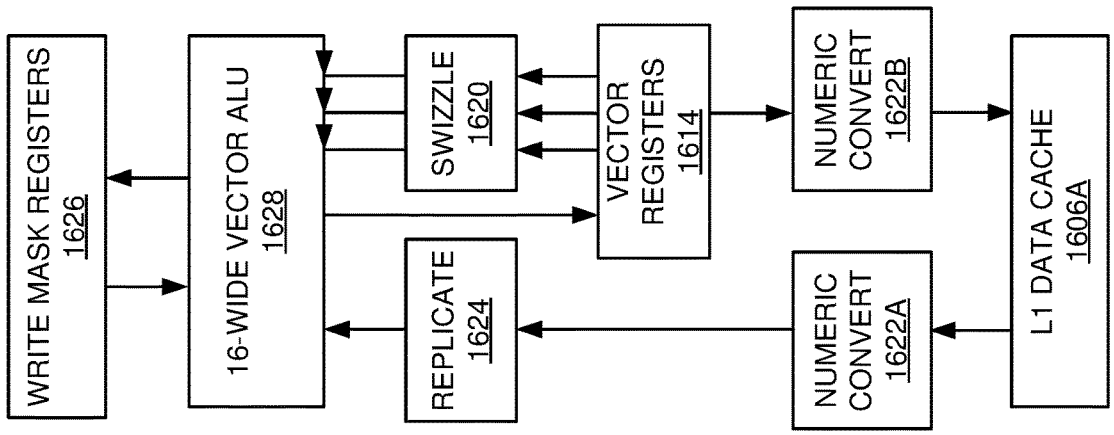
FIG. 16B is an expanded view of part of the processor core in FIG. 16A according to embodiments of the invention.
Figure 16A:
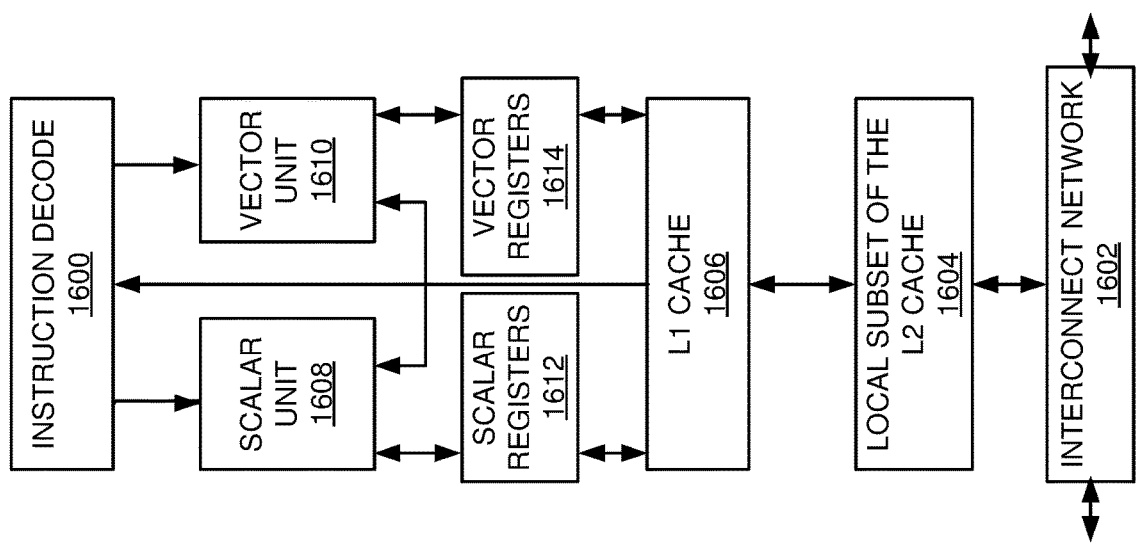
FIG. 16A is a block diagram of a single processor core, along with its connection to the on-die interconnect network 1602 and with its local subset of the Level 2 (L2) cache 1604, according to embodiments of the invention.

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network 1602 and with its local subset of the Level 2 (L2) cache 1604, according to embodiments of the invention. In one embodiment, an instruction decoder 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the invention may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the invention. FIG. 16B includes an L1 data cache 1606A part of the L1 cache 1604, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
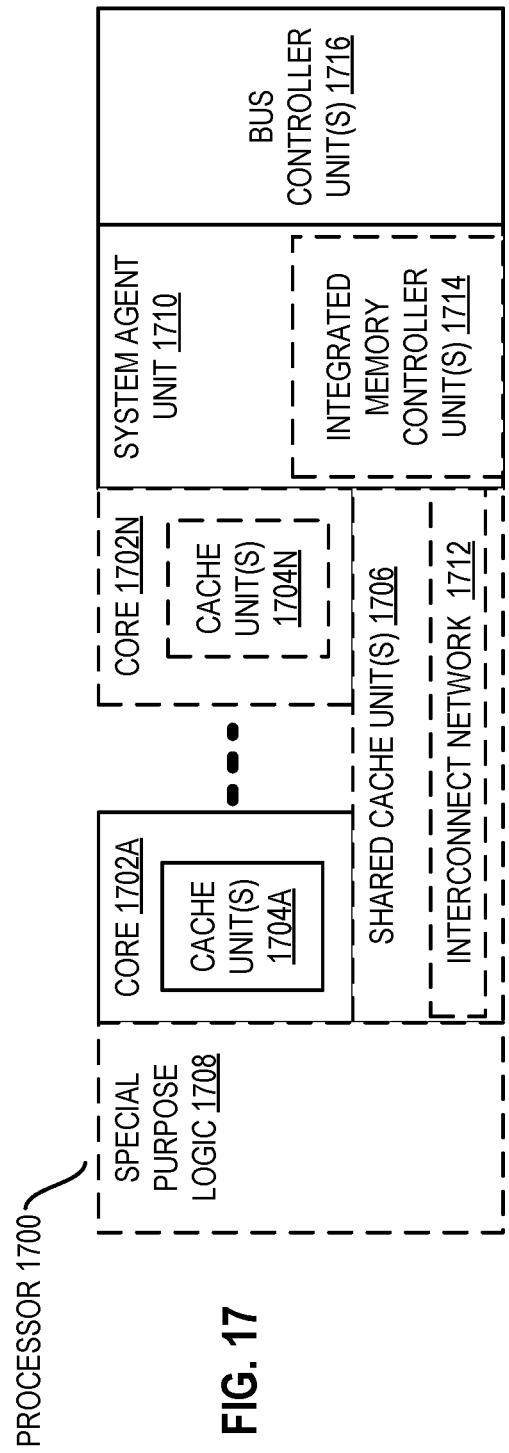
FIG. 17 is a block diagram of a processor 1700 that may have more than one core, may have an integrated memory controller, and may have integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708 (integrated graphics logic 1708 is an example of and is also referred to herein as special purpose logic), the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multithreading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
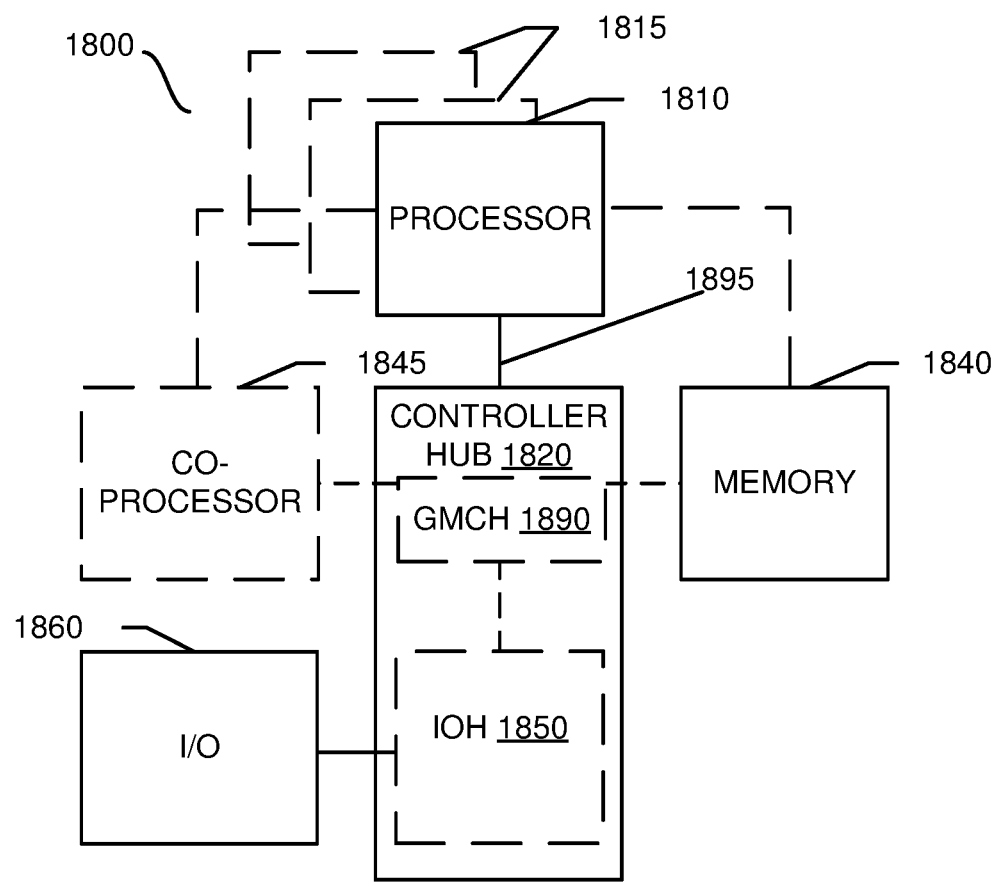
FIG. 18 shown a block diagram of a system in accordance with one embodiment of the present invention.

Referring now to FIG. 18, shown is a block diagram of a system 1800 in accordance with one embodiment of the present invention. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as QuickPath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources 1810, 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
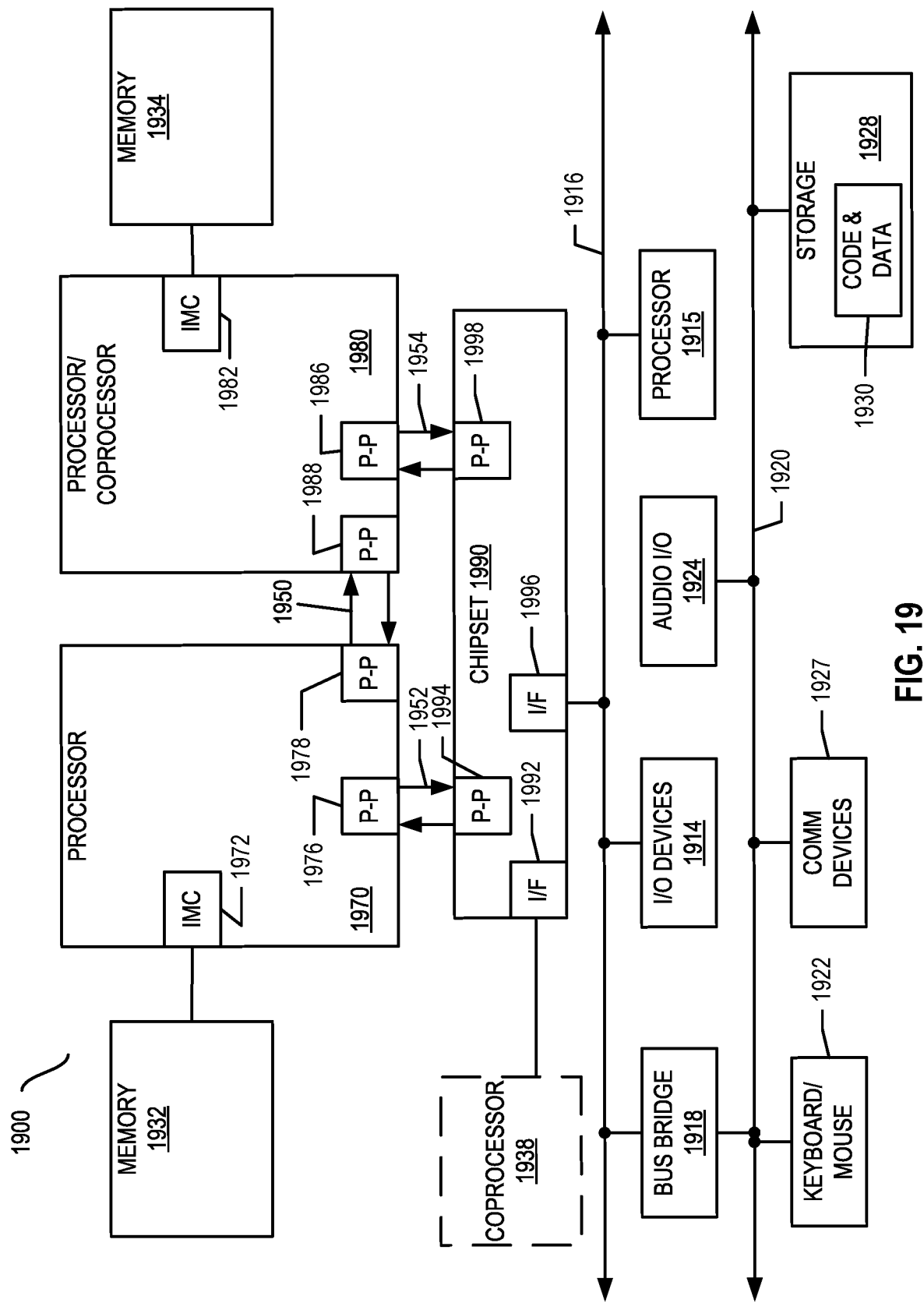
FIG. 19 is a block diagram of a first more specific exemplary system in accordance with an embodiment of the present invention.

Referring now to FIG. 19, shown is a block diagram of a first more specific exemplary system 1900 in accordance with an embodiment of the present invention. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the invention, processors 1970 and 1980 are respectively processors 1810 and 1815, while coprocessor 1938 is coprocessor 1845. In another embodiment, processors 1970 and 1980 are respectively processor 1810 coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1992. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present invention is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
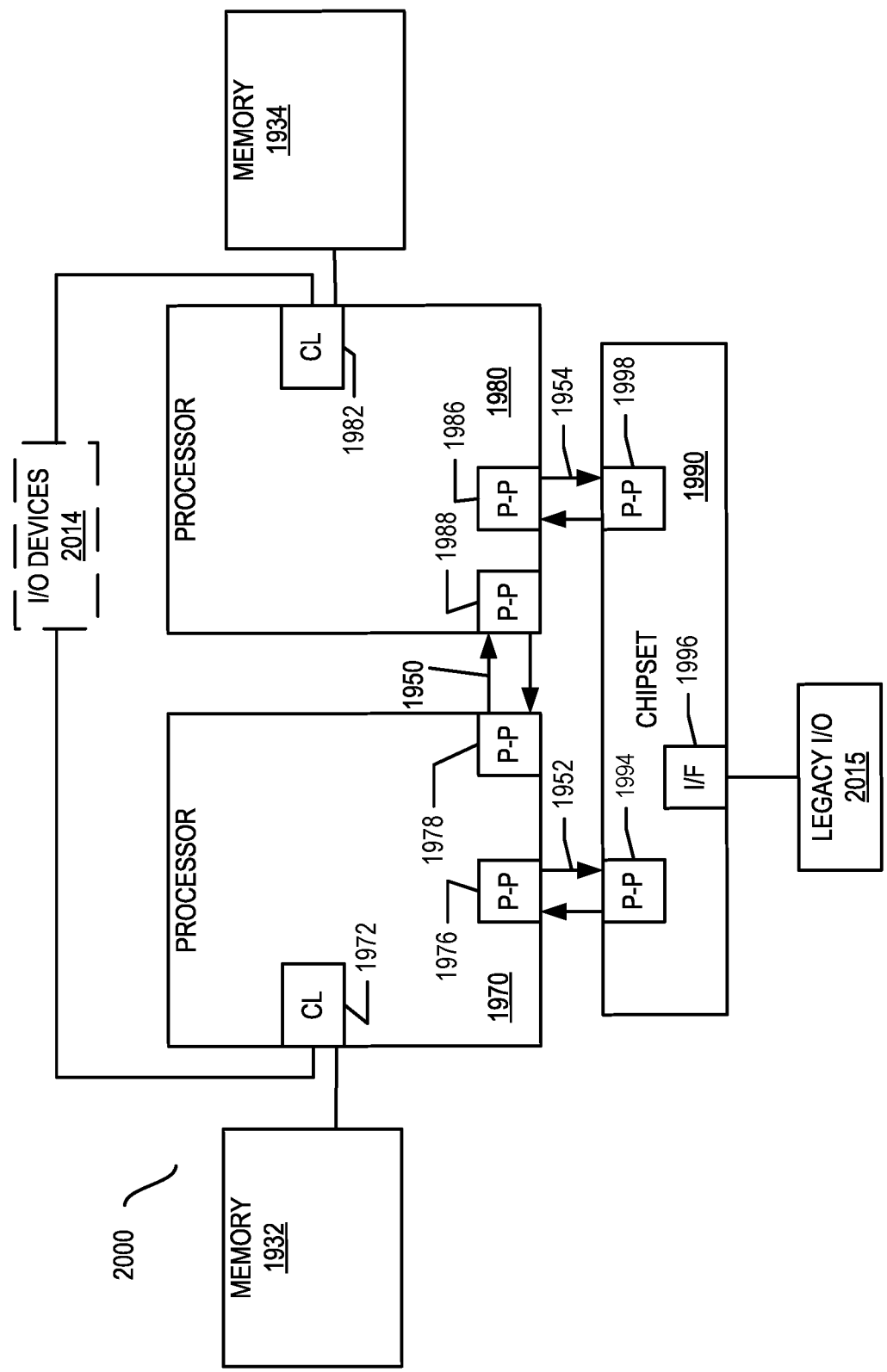
FIG. 20 is a block diagram of a second more specific exemplary system in accordance with an embodiment of the present invention.

Referring now to FIG. 20, shown is a block diagram of a second more specific exemplary system 2000 in accordance with an embodiment of the present invention. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
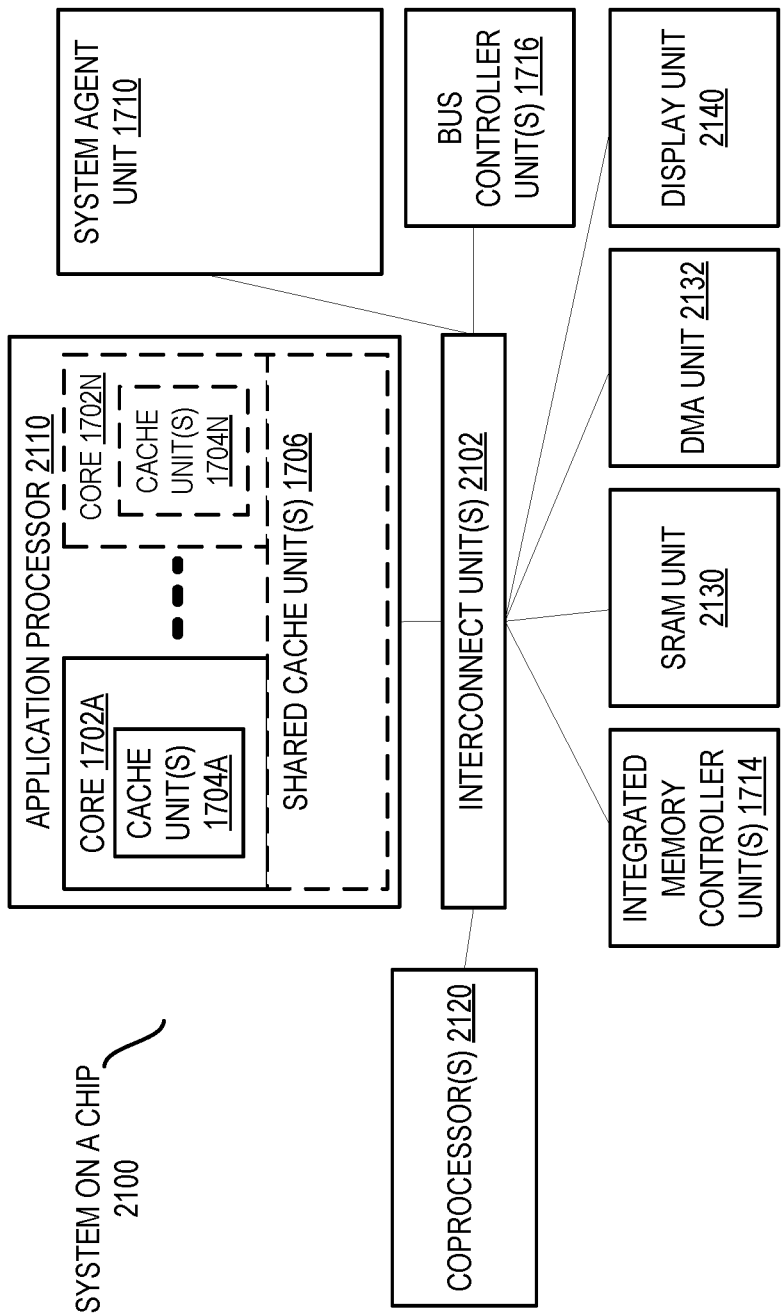
FIG. 21 is a block diagram of a SoC in accordance with an embodiment of the present invention.

Referring now to FIG. 21, shown is a block diagram of a SoC 2100 in accordance with an embodiment of the present invention. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N, which include cache units 1704A-N, and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 22 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

What is claimed is:

1. A processor comprising:
a memory controller;
an interconnect fabric coupled to the memory controller;
an instruction cache to store instructions fetched from a system memory via the memory controller;
a data cache to store source data elements to be processed in response to the instructions and result data elements comprising results of the instructions;
a next level cache to store the source data elements, the result data elements, and the instructions; and
a plurality of data parallel processing circuits coupled to the interconnect fabric, the plurality of data parallel processing circuits to perform parallel operations on a plurality of the source data elements, at least one data parallel processing circuit comprising:
operand storage to store a first plurality of the source data elements at a first precision and a second plurality of source data elements at a second precision which is four times the first precision;
execution circuitry comprising a plurality of multiply-accumulate circuits to execute a plurality of fused multiply-accumulate (FMA) instructions to perform parallel FMA operations using at least a portion of the first and second plurality of source data elements to generate a plurality of result data elements at the second precision, a multiply-accumulate circuit of the plurality of multiply-accumulate circuits comprising:
one or more multipliers to perform four parallel multiplications of source data elements from the first plurality, the multiplications including a first multiplication of a first source data element and a second source data element to generate a first product, a second multiplication of a third source data element and a fourth source data element to generate a second product, a third multiplication of a fifth source data element and a sixth source data element to generate a third product, and a fourth multiplication of a seventh source data element and an eighth source data element to generate a fourth product, and
one or more adder circuits to add the first product, second product, third product, fourth product, and a ninth source data element of the second plurality of source data elements to generate a first result data element at the second precision.

2. The apparatus of claim 1 wherein the first plurality of source data elements at the first precision comprise data elements of first and second matrices on which a dot-product is to be performed.

3. The apparatus of claim 1 further comprising:
an I/O interface coupled to the interconnect fabric, the I/O interface to couple the plurality of data parallel processing circuits to an I/O device.

4. The apparatus of claim 1 wherein the execution circuitry comprises vector execution circuitry and the operand storage comprises a vector register file.

5. The apparatus of claim 4 further comprising:
scalar execution circuitry to execute scalar instructions; and
a scalar register file to store operands to be used as source values for the scalar instructions.

6. The apparatus of claim 5 further comprising:
direct memory access (DMA) circuitry coupled to the interconnect fabric, the DMA circuitry to provide direct access to the system memory.

7. The apparatus of claim 1 further comprising:
cache coherency circuitry to maintain coherency of the data elements across the data cache, the next level cache, and the system memory.

8. The apparatus of claim 1 wherein the plurality of multiply-accumulate circuits comprise a plurality of fused multiply-accumulate (FMA) circuits.

9. A method comprising:
fetching instructions from a system memory via a memory controller, the instructions to be stored in an instruction cache;
storing source data elements of the instructions in a data cache;
performing parallel operations on a plurality of data parallel processing circuits using a plurality of the source data elements in accordance with a first one or more of the instructions, at least a portion of the parallel operations comprising:
storing in an operand storage a first plurality of the source data elements at a first precision and a second plurality of source data elements at a second precision which is four times the first precision;
performing parallel fused multiply-accumulate (FMA) operations on a plurality multiply-accumulate circuits using at least a portion of the first and second plurality of source data elements to generate a plurality of result data elements at the second precision, a parallel FMA operation performed on one of the plurality of multiply-accumulate circuits comprising:
performing four parallel multiplications of source data elements from the first plurality, the multiplications including a first multiplication of a first source data element and a second source data element to generate a first product, a second multiplication of a third source data element and a fourth source data element to generate a second product, a third multiplication of a fifth source data element and a sixth source data element to generate a third product, and a fourth multiplication of a seventh source data element and an eighth source data element to generate a fourth product, and
adding the first product, second product, third product, fourth product, and a ninth source data element of the second plurality of source data elements to generate a first result data element at the second precision.

10. The method of claim 9 wherein the first plurality of source data elements at the first precision comprise data elements of first and second matrices on which a dot-product is to be performed.

11. The method of claim 9 wherein the operand storage comprises a vector register file.

12. The method of claim 9 wherein a second one or more of the instructions comprise scalar instructions, the method further comprising: executing the scalar instructions with scalar execution circuitry, the scalar execution circuitry including a scalar register file to store operands to be used as source values for the scalar instructions.

13. The method of claim 12 further comprising:
providing direct access to the system memory via direct memory access (DMA) circuitry.

14. The method of claim 9 further comprising:
maintaining coherency of the source data elements across the data cache, the system memory, and one or more additional caches.

15. The method of claim 9 wherein the plurality of multiply-accumulate circuits comprise a plurality of fused multiply-accumulate (FMA) circuits.

16. A machine-readable medium having instructions stored thereon which, when executed by a machine, causes the machine to perform the operations of:
storing source data elements of the instructions in a data cache;
performing parallel operations on a plurality of data parallel processing circuits using a plurality of the source data elements in accordance with a first one or more of the instructions, at least a portion of the parallel operations comprising:
storing in an operand storage a first plurality of the source data elements at a first precision and a second plurality of source data elements at a second precision which is four times the first precision;
performing parallel fused multiply-accumulate (FMA) operations on a plurality multiply-accumulate circuits using at least a portion of the first and second plurality of source data elements to generate a plurality of result data elements at the second precision, a parallel FMA operation performed on one of the plurality of multiply-accumulate circuits comprising:
performing four parallel multiplications of source data elements from the first plurality, the multiplications including a first multiplication of a first source data element and a second source data element to generate a first product, a second multiplication of a third source data element and a fourth source data element to generate a second product, a third multiplication of a fifth source data element and a sixth source data element to generate a third product, and a fourth multiplication of a seventh source data element and an eighth source data element to generate a fourth product, and
adding the first product, second product, third product, fourth product, and a ninth source data element of the second plurality of source data elements to generate a first result data element at the second precision.

17. The machine-readable medium of claim 16 wherein the first plurality of source data elements at the first precision comprise data elements of first and second matrices on which a dot-product is to be performed.

18. The machine-readable medium of claim 16 wherein the operand storage comprises a vector register file.

19. The machine-readable medium of claim 18 wherein a second one or more of the instructions comprise scalar instructions to be executed by scalar execution circuitry, the scalar execution circuitry including a scalar register file to store operands to be used as source values for the scalar instructions.

20. The machine-readable medium of claim 19 further comprising instructions to cause the machine to perform the operation of:
    providing direct access to the system memory via direct memory access (DMA) circuitry.

21. The machine-readable medium of claim 16 further comprising instructions to cause the machine to perform the operation of:
    maintaining coherency of the source data elements across the data cache, the system memory, and one or more additional caches.

22. The machine-readable medium of claim 16 wherein the plurality of multiply-accumulate circuits comprise a plurality of fused multiply-accumulate (FMA) circuits.

23. A system comprising:
    a system memory to store instructions; and
    a processor comprising:
        a memory controller to couple the processor to the system memory;
        an interconnect fabric coupled to the memory controller;
        an instruction cache to store instructions fetched from a system memory via the memory controller;
        a data cache to store source data elements to be processed in response to the instructions and result data elements comprising results of the instructions;
        a next level cache to store the source data elements, the result data elements, and the instructions; and
        a plurality of data parallel processing circuits coupled to the interconnect fabric, the plurality of data parallel processing circuits to perform parallel operations on a plurality of the source data elements, at least one data parallel processing circuit comprising:
            operand storage to store a first plurality of the source data elements at a first precision and a second plurality of source data elements at a second precision which is four times the first precision;
            execution circuitry comprising a plurality of multiply-accumulate circuits to execute a plurality of fused multiply-accumulate (FMA) instructions to perform parallel FMA operations using at least a portion of the first and second plurality of source data elements to generate a plurality of result data elements at the second precision, a multiply-accumulate circuit of the plurality of multiply-accumulate circuits comprising:
                one or more multipliers to perform four parallel multiplications of source data elements from the first plurality, the multiplications including a first multiplication of a first source data element and a second source data element to generate a first product, a second multiplication of a third source data element and a fourth source data element to generate a second product, a third multiplication of a fifth source data element and a sixth source data element to generate a third product, and a fourth multiplication of a seventh source data element and an eighth source data element to generate a fourth product, and
                one or more adder circuits to add the first product, second product, third product, fourth product, and a ninth source data element of the second plurality of source data elements to generate a first result data element at the second precision.

24. The system of claim 23 wherein the first plurality of source data elements at the first precision comprise data elements of first and second matrices on which a dot-product is to be performed.

25. The system of claim 23 wherein the processor further comprises:
    an I/O interface coupled to the interconnect fabric, the I/O interface to couple the plurality of data parallel processing circuits to an I/O device.

26. The system of claim 23 wherein the execution circuitry comprises vector execution circuitry and the operand storage comprises a vector register file.

27. The system of claim 26 wherein the processor further comprises:
    scalar execution circuitry to execute scalar instructions; and
    a scalar register file to store operands to be used as source values for the scalar instructions.

28. The system of claim 27 wherein the processor further comprises:
    direct memory access (DMA) circuitry coupled to the interconnect fabric, the DMA circuitry to provide direct access to the system memory.

29. The system of claim 23 wherein the processor further comprises:
    cache coherency circuitry to maintain coherency of the data elements across the data cache, the next level cache, and the system memory.

30. The system of claim 23 wherein the plurality of multiply-accumulate circuits comprise a plurality of fused multiply-accumulate (FMA) circuits.

31. The system of claim 23 further comprising:
    a graphics processor coupled to the processor, the graphics processor to execute graphics instructions.

32. The system of claim 31 further comprising:
    an I/O interface to couple the graphics processor to the processor.

33. The system of claim 23 further comprising:
    a communication processor coupled to the processor.

34. The system of claim 23 further comprising:
    a storage device coupled to the processor.

* * * * *